(12) United States Patent
Gehring

(10) Patent No.: US 9,712,635 B2
(45) Date of Patent: *Jul. 18, 2017

(54) AGGREGATED DATA IN A MOBILE DEVICE FOR SESSION OBJECT

(71) Applicant: Accenture Global Services Limited, Dublin (IE)

(72) Inventor: Sjoerd Gehring, New York, NY (US)

(73) Assignee: Accenture Global Services Limited, Dublin (IE)

( * ) Notice: Subject to any disclaimer, the term of this patent is extended or adjusted under 35 U.S.C. 154(b) by 207 days.

This patent is subject to a terminal disclaimer.

(21) Appl. No.: 14/808,201

(22) Filed: Jul. 24, 2015

(65) Prior Publication Data

US 2016/0028848 A1 Jan. 28, 2016

Related U.S. Application Data

(60) Provisional application No. 62/029,349, filed on Jul. 25, 2014.

(51) Int. Cl.
*H04L 29/08* (2006.01)
*H04L 29/06* (2006.01)

(52) U.S. Cl.
CPC ........ *H04L 67/2842* (2013.01); *H04L 67/143* (2013.01); *H04L 67/146* (2013.01)

(58) Field of Classification Search
CPC . H04L 67/2842; H04L 67/143; H04L 67/146; H04L 63/102; H04L 63/0807; G06F 3/0484; G06Q 10/105; G06Q 10/1095; H04W 12/08
See application file for complete search history.

(56) References Cited

U.S. PATENT DOCUMENTS

| | | | | |
|---|---|---|---|---|
| 2009/0100037 A1* | 4/2009 | Scheibe | ............ | G06F 17/3087 |
| 2012/0123958 A1* | 5/2012 | Wahls | ............... | G06Q 10/1053 |
| | | | | 705/321 |
| 2012/0311460 A1* | 12/2012 | Boyd | .................. | G06Q 10/109 |
| | | | | 715/752 |
| 2013/0024233 A1* | 1/2013 | Aaron | ................. | G06Q 10/109 |
| | | | | 705/7.19 |
| 2013/0046704 A1* | 2/2013 | Patwa | .................... | G06Q 10/06 |
| | | | | 705/321 |

(Continued)

*Primary Examiner* — Noura Zoubair
(74) *Attorney, Agent, or Firm* — Brinks Gilson & Lione

(57) ABSTRACT

A method, a device and a system for providing access to a mobile device for a session object to aggregated data associated with a session are provided. The method includes populating data records of a data repository of a data management system from an external data system; generating first information in the data records stored in the data repository; caching the first information on a caching server; creating an application link to be displayed in a mobile device, wherein the application link enables the access to the cached first information; providing an access authorization to the mobile device; retrieving the cached first information from the caching server; displaying the cached first information in a user interface of the mobile device; generating second information dynamically; displaying the second information in the user interface; providing an evaluation for the job candidate; and deactivating the application link after the session takes place.

20 Claims, 31 Drawing Sheets

(56) References Cited

U.S. PATENT DOCUMENTS

| | | | |
|---|---|---|---|
| 2013/0191299 A1* | 7/2013 | Hermsdorff | G06Q 10/1053 705/321 |
| 2014/0081884 A1 | 3/2014 | Govindaraman et al. | |
| 2014/0278683 A1* | 9/2014 | Kennell | G06Q 10/1053 705/7.19 |
| 2014/0310266 A1* | 10/2014 | Greenfield | G06F 17/3053 707/723 |
| 2015/0193819 A1* | 7/2015 | Chang | G06Q 10/1095 705/7.19 |
| 2015/0278769 A1* | 10/2015 | Zamer | G06Q 10/1095 705/7.19 |

\* cited by examiner

1400 — Session Creator enters information in the back end:

```
Interview App Database  Home  Manage▼  Support       Logged in as ******sample.com  Log Out
```

Create Interview  [← Back]

Fields with * are required.
Candidate

E-mail *
[🔍 john@example.com]

First name *          Last name *
[John]                [Doe]

Phone *               LinkedIn profile URL
Country    Area       [uk.linkedin.com/in/johndoe]
Code [+44] Code [5555555555]
                      ATAS ID
                      [                    ]

[Add new interview]

| Interview | Interviewers |

Interview Location *        Interviewer 1 | Interviewer 2 | Interviewer 3
[Netherlands ▼]             E-mail *
[Company ▼]                 [🔍 joe@example.com]
Date*                       First name *
[2014-05-30]           📅   [Joe]
Time*
[09:00 AM]             🕒   Last name *
Language *                  [Smith]
[English ▼]                 Job title *
Notify by *                 [Senior Recruiter]
[E-mail ▼]                  Phone
Agenda                      Country    Area
| Time | Title |            Code [+44] Code [5555555555]
|      |       |            LinkedIn profile URL
                            [uk.linkedin.com/in/joesmith]

Interviews

[+ Create Interview]

[Upcoming] Past Interviews  Drafts

| ID | Candidate first name | Candidate last name | Candidate email | Job number |

Date. from [ ]  Date. to [ ]
[▽ Filter Results]  [Reset]

| ID | Candidate | Address | Job |
|---|---|---|---|
| 25 | Candidate Name 1 (1 of 1 interviews) | Address, New York, 10105, United States | 00230960 Company - Digital Analytics Manager |
| 19 | Candidate Name 2 (1 of 4 interviews) | Address, New York, 10105, United States | 003 Marketing Analytics Consultant |
| 20 | Candidate Name 3 (1 of 1 interviews) | Address, New York, 10105, United States | 001 Technical Architecture Consultant |

[« First] [< Previous] [1] [Next >] [Last »]

| Date | Time | Team | | | | |
|---|---|---|---|---|---|---|
| May 23, 2014 | 19:54:00 | default | ◇ View (1) | ✉ Contact Recruiter | ✎ Update | 🗑 Delete |
| May 29, 2014 | 16:05:00 | default | ◇ View (4) | ✉ Contact Recruiter | ✎ Update | 🗑 Delete |
| May 31, 2014 | 16:06:00 | default | ◇ View (1) | ✉ Contact Recruiter | ✎ Update | 🗑 Delete |

Showing 1 - 3 of 3

⊖ Export as CSV

| Foursquare categories | Job Details |
|---|---|
| | Click here to edit this job · Clear form |
| Tip 1 · Tip 2 · Tip 3 | Requisition Number * |
| Recruiter tip* | 001 |
| Please select a tip... | Job Title (max. 60 characters) * |
| Title | Financial Analyst |
| | Job Summary * |
| | Join Company and help transform leading organizations and communities around the world. The sheer scale of our capabilites and client engagements and the way we ……… |
| Recruiters LinkedIn profile URL | Job Location * |
| https://*linkedin.com/******* | United states |
| | Address, New York, 12345, ... |
| | Travel |
| | 50% |
| | Schedule |
| | Full Time |

☑ Send notification to Interviewer(s)

[✓ Create] [○ Save as draft] [○ Add Another] [○ Preview as Candidate] [○ Preview as Interviewer] [Cancel]

| Interview |
|---|
| **Interview Location *** |
| Netherlands |
| Address |
| **Date *** |
| |
| **Time *** |
| 10:19 PM |
| **Notify by *** |
| E-mail |

Dutch
✓ English
French
German

Tip 1  Tip 2  Tip 3

Recruiter tip *

FIG. 24

AGGREGATED DATA IN A MOBILE DEVICE FOR SESSION OBJECT

CROSS-REFERENCE TO RELATED APPLICATIONS

This application claims the benefit of U.S. Provisional Application 62/029,349, filed on Jul. 25, 2014, which is hereby incorporated by reference in its entirety.

FIELD OF THE TECHNOLOGY

The invention relates to the field of mobile technology, and more particularly, it relates to a method, a device and a system for providing access on a mobile device to aggregated data.

BACKGROUND OF THE TECHNOLOGY

Data processing includes data collection, data displaying and data analysis. Data processing may be utilized for facilitating the display of sessions. Mobile applications are fast developing area that may be used for the data processing. A mobile app is a computer program that is designed to run on mobile terminals including smartphone, table computers and other mobile devices. The mobile app may be a web application that associates with a backend data management system. The mobile app may also be used for data processing to hold a session.

SUMMARY

Examples of the present disclosure provide at least a method, a mobile device and a system for providing access on a mobile device to aggregated data for holding a session. Particularly the present disclosure discloses a mobile app that is used for displaying aggregated data related to the session (hereinafter referred to as the "Session App"). The method, mobile device and the system may be directed to sessions either for a candidate token or a session object. Examples of the present disclosure provide the following technical solutions.

For example, a method for providing access on a mobile device for a session object to aggregated data associated with a session is provided. The method includes steps of populating data records of a data repository of a data management system from an external data system, where the external data system may include locations and personnel identifications, and generating first information in the data records stored in the data repository by associating a session identification with the session object, and selecting a session time, a session locality and candidate token information.

The method also includes the steps of caching the first information stored in the data repository on a caching server, creating an application link to be displayed in a mobile device, where the application link may enable the access to the cached first information that is stored in the data repository, providing an access authorization to the mobile device for accessing the first information by activating the application link displayed on the mobile device, retrieving the cached first information from the caching server of the data repository of the data management system in response to activation of the application link by the mobile device after the access authorization for accessing the first information is provided, and displaying the cached first information in a user interface of the mobile device.

Further, the method may have steps of: generating second information dynamically according to predetermined factors including: the session time and the session locality, and dynamic factors comprising a second time and a second location of the session object, wherein the second information comprises at least one of: mapping information and a temporary queue, displaying the second information in the user interface of the mobile device, and providing an evaluation, via the user interface, for the candidate token and storing the evaluation in the data repository.

Finally, the method may be deactivating the application link to revoke the access authorization to the first information and the second information in a pre-determined period after the session time.

The present disclosure also provides a system for providing access on a mobile device for a session object to aggregated data associated with a session.

The system may include a processor and a non-transitory computer readable medium storing computer instructions configured to cause the processor to: populate data records of a data repository of a data management system from an external data system, where the external data system may include locations and personnel identifications.

Also, the system may be configured to generate first information in the data records stored in the data repository by associating a session identification with the session object, and selecting a session time, a session locality and candidate token information, cache the first information stored in the data repository on a caching server, create an application link to be displayed in a mobile device, where the application link may enable the access to the cached first information that is stored in the data repository, provide an access authorization to the mobile device for accessing the first information by activating the application link displayed on the mobile device, retrieve the cached first information from the caching server of the data repository of the data management system in response to activation of the application link by the mobile device after the access authorization for accessing the first information is provided, and display the cached first information in a user interface of the mobile device.

The system may be further configured to generate second information dynamically according to predetermined factors comprising: the session time and the session locality, and dynamic factors comprising a second time and a second location of the session object, where the second information may include at least one of: mapping information and a temporary queue, display the second information in the user interface of the mobile device, and provide an evaluation, via the user interface, for the candidate token and store the evaluation in the data repository.

Finally, the system may deactivate the application link to revoke the access authorization to the first information and the second information in a pre-determined period after the session time.

Also, the present disclosure provides a mobile device for providing access on the mobile device for an session object to aggregated data associated with a session. The mobile device includes a user interface that is configured to display an application link in the mobile device, wherein the application link enables the access to first information that is stored in a data repository of a data management system, where the data management system may populate data records of the data repository from an external data system, the external data system comprising locations and personnel identifications.

The mobile device is further configured to activate the application link displayed on the mobile device to gain an access authorization for accessing the first information stored in the data repository that is generated in the data records stored in the data repository by associating a session identification with the session object, and selecting a session time, a session locality and candidate token information, where the first information may be cached in a caching server.

The mobile device is further configured to retrieve the cached first information from the caching server of the data repository of the data management system in response to activation of the application link by the mobile device after the access authorization for accessing the first information is provided, and display the cached first information in a user interface of the mobile device.

The mobile device may receive second information that is dynamically generated according to predetermined factors and dynamic factors wherein the predetermined factors comprise: the session time and the session locality, and the dynamic factors comprise: a second time and a second location of the session object, and wherein the second information comprises at least one of: mapping information and a temporary queue, display the second information in the user interface of the mobile device, and receive an evaluation, via the user interface, for the candidate token and store the evaluation in the data repository.

Finally, the mobile may receive an indicator to indicate that the application link is deactivated to revoke the access authorization to the first information and the second information in a pre-determined period after the session time.

BRIEF DESCRIPTION OF THE DRAWINGS

To explain the technical proposals of the examples of the present disclosure or prior art more clearly, the appended drawings used in the examples are briefly described hereunder. Apparently, the following described drawings are some examples of the present disclosure, but for persons skilled in the art, other drawings may be obtained without creative works according to these drawings.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIGS. 14A-C illustrate an example that the recruiter enters the information that is displayed in the user interface on the mobile device for the session.

FIGS. 15A-B illustrate an example to create data records in the user interface of the backend system for the session.

FIGS. 18A-B show an example for the backend user interface for creating data entries for the candidate token and the session object.

FIG. 23 shows an example of the user interface for creating roles and displaying session locations in the backend user interface.

FIG. 24 shows an example for selecting language in the backend user interface.

DETAILED DESCRIPTION OF ILLUSTRATED EXAMPLES

Figure 1:
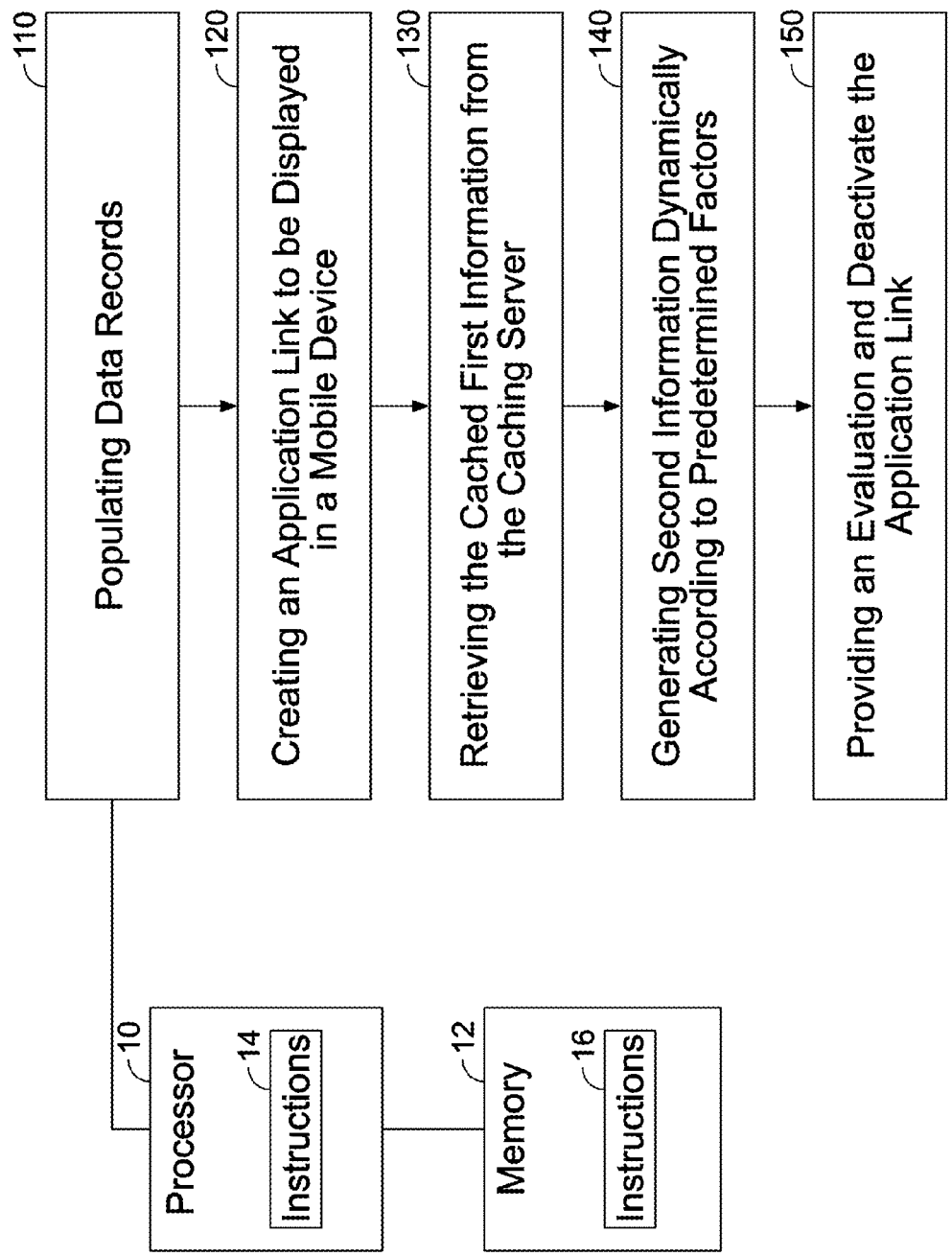
FIG. 1 is a flowchart of an example of a method for providing access on a mobile device to aggregate data associated with a job interview.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment. Furthermore, the particular features, structures, or characteristics may be combined in any suitable manner in one or more embodiments or examples.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the terms "module," "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client or the device may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. This invention will become apparent from the following detailed description when taken in conjunction with the accompanying drawings.

It should be noticed that, the steps illustrated in the flowchart of the drawings may be performed in a set of computer device with executable program codes. And the order of the steps may be different from that in the drawings under some status, although a logic order is shown in the flowchart.

The purpose, technical proposal and advantages in the examples of the present disclosure will become more clear and complete from the following detailed description when taken in conjunction with the appended drawings. Apparently, the examples described thereinafter are merely a part of examples of the present disclosure, not all examples. Persons skilled in the art can obtain all other examples without creative works, based on these examples, which pertains to the protection scope of the present disclosure.

In general, data for displaying a session to a session object may be aggregated and displayed on a mobile device. A session detail may include session time, session locality, and session information. The participants of the session may be represented by tokens and session object. There may be many implementations for a session on a mobile device. For example, a job interview may be one of implementations of a session. In such an implementation, a session may be a job interview, and a candidate token may be a job candidate, and a session object may be an interviewer.

A job interview may be conducted between a job candidate (may be represented by a candidate token) and one or more interviewers (may be represented by session objects). Traditionally, the job candidate and the interviewer may be given one or more printed copies of interview information such as name of the job candidate and/or the interviewer and/or time/location of the interview before the interview is conducted. The printed copies may be intended to facilitate the interview. Even with the fast development of the mobile technology, printed copies may be used because they are inexpensive.

However, the printed copies may have certain limitations. For example, printed copies have limited spaces and may not be changed after they are printed. In addition, the printed copies may not be easy to carry.

As such, when the number of job interviews is big, the mobile technology may be used to display interview information on the mobile device for both a job candidate and an interviewer. The present disclosure discloses a mobile app that may be used for displaying aggregated data related to a session ("Session App"). A particularly implementation of such Session App may be an Interview App for a job candidate or an interviewer ("Interview App"). The Session App may thus be referred as the Interview App. The Session App may be a web platform based application to help job candidates and interviewers to prepare for and the travel and their interviews.

FIG. 1 a flowchart of an example of a method for providing access on a mobile device to aggregated data associated with a session. All steps shown in FIG. 1 may be performed by executing instructions 16 stored in memory 12 by one or more processors 10.

Step 110: Populating data records. An example implementation of Step 110 may include: populating data records of a data repository of a data management system from an external data system, where the external data system comprising locations and personnel identifications, generating first information in the data records stored in the data repository by associating a session identification with the session object, and selecting a session time, a session locality and candidate token information, and caching the first information stored in the data repository on a caching server.

Another example of Step 110 may include: populating data records of a data repository of a data management system from an external data system of an enterprise, the external data system comprising locations and personnel of the enterprise; generating first information in the data records stored in the data repository by associating an identification of the interviewer with an interview time, an interview location and job candidate information; caching the first information stored in the data repository on a caching server.

In order to display interview related information in a user interface on a mobile device, there is a need to establish a backend data management system. The Session App may display the interview data records. The interview data records includes all interview related data such as job candidate, interviewer, interview location/time and job descriptions, resumes, interviewer's profile, interview tips, the direction to the interview locations, etc. The interview data records may be stored and maintained on the backend data management system. Each set of interview data records may associate with an identification of a job candidate or an interviewer.

The data management system may be supported by one or more servers and may access data records stored in a data repository system, such as a database. Some of data records stored in the data repository system may be fetched from an external system. For example, office locations, interviewer profiles, etc. The population of the records in the data management system from the external HR system may be done as a "pre-population" basis. The "pre-population" means the data records in the data management system to support the Session App may be generated before the Session App is activated on the mobile device.

The population and/or update of data records may also be performed during the operation of the Session App. Such population and/or update may be done several times a day or several days a time. Any pre-determined population/update frequencies, even-driven and real-time population/updates are within the scope of the present disclosure.

The backend data management system may be shared for both job candidates and interviewers who may be the users of the Session App. Even though the job candidate and the interviewer may need different information to be displayed on the mobile device, the backend supporting system may be shared. For example, the interview locations, the interview time. Both job candidate and the interviewer may have the same interview locations and the interview time.

The data records may also be populated manually. For example, the recruiter for a job may identify the job candidate and the interviewer. And then, the recruiter may manually create data records in the data repository. All information fetched from the external system may also be manually created and updated. The system may provide a user interface for the recruiter and/or others to manually create and/or update the data records for interview related data records and save those data records in the data repository of the data management system.

The job candidate and interviewer may have different sets of data records for the interview. For example, the job candidate may be provided with the information regarding the interviewer profile and tips for the interview. On the other hand, the interviewer may be provided with job candidate introduction and interview questions, The proper data records may be selected from the data repository by using the identification of either the job candidate or the interviewer for the data records stored in the data repository.

The data records may be generated for multiple interviews. Multiple interviews may be scheduled for one job candidate and interviewer, and multiple interviewers may be scheduled to interview one job candidate. As such, data records for multiple interviews or multiple interviewers may be selected from the data repository.

There may be multiple sets of data records for the interview. For example, one set of data records may be generated when the interviewer or the job candidate first gains the access to the backend data repository via mobile device. Such data records include interview time/location, introductions to the job candidate or the interviewer, and the direction to the interview location, etc. In addition, another set of data records may be generated after the interviewer or the job candidate is provided the access to the backend data repository. Such set of data records may be generated dynamically. For example, traffic information or a coffee shop nearby the job interview location for the job candidate to rest before the interview. Because the traffic information may not be known in advance, and the possible schedule change may cause the job interview to find the different coffee shop to rest, the second set of data records may not be generated too far before the interview is conducted. Therefore, the second set of data records may be generated dynamically by using the current time/location and the interview time/location.

The data records in the data repository may be shared among multiple interviews. Because one job candidate or one interviewer may have multiple interviews. When a new interview data record is created, the system may search to find out whether the needed data records existed in the system. The existing data records may be used to create the new data records for a newly created interview. As such, the data population from the external system or manually population may be reduced.

The interview data records may be cached. The Session App is an application to enable the display of the interview data on a mobile device. There is a need to save the time to query the data records stored in the data repository when the data records are displayed in the screen (the user interface) of the mobile device. Therefore, the data records for one job candidate or one interviewer may be cached to increase the speed to access those data records by the Session App from the mobile device. A backend caching server may be used for caching the data records. The Session App may read interview data records from the caching server.

The data records may be cached when data records are read for the first time. One consideration for caching data records is when the data record caching takes place. The data records may be cached when the first time those data records are read. As such, the data records for a job candidate or an interviewer may be retrieved from data repository and saved to the caching server when the Session App runs for the first time. Because the first run needs to retrieve data records from data repository and also needs to save the data records to the caching server, the first run may take a long period of time.

The data records may be cached when they are created. The second way to cache data records may be when those data records are created in the system. When the data records are created in the system, a copy of the data records is saved to the caching server. By this way, the first read for the Session App should be fast because data records are read from the cached server. However, the extra step may be needed when data records are created.

The cached data records may need to be updated. The updates to the cached data records are necessary when the data records are changed. A dirt bit indicator may be utilized to indicate the data record is updated. Such a dirt bit may trigger the update in the caching server for the data records.

Some data records may be required data records for the Session App. For example, an interview must include data records for: an interview time, an interview location, an interviewer for the job candidate and a job candidate for the interviewer. Therefore, the interview time, the interview location, the interviewer for the job candidate and the job candidate for the interviewer may be required data records.

Step 120: Creating an application link to be displayed in a mobile device. One example of Step 120 may include: creating an application link to be displayed in a mobile device, where the application link may enable the access to the cached first information that is stored in the data repository, and providing an access authorization to the mobile device for accessing the first information by activating the application link displayed on the mobile device. Another example of Step 120 may include creating an application link to be displayed in a mobile device, wherein the application link enables the access to the cached first information that is stored in the data repository; providing an access authorization to the mobile device for accessing the first information by activating the application link displayed on the mobile device.

The job candidate or the interviewer may view an application link on their mobile device when the interview is created on the backend system. Initially, when a set of data records is created for the interview and is ready to be viewed by a job candidate or an interviewer, the job candidate or the interviewer should be notified. One possible way to notify the job candidate or the interviewer is sending an application link that is embedded in an instant message that sends to the mobile device of the job candidate or the interviewer. The instant message may be received and displayed in the SMS, email or any other social media tool that may be used to view the instant message and the application link on the mobile device of the job candidate or the interviewer.

The job candidate or the interviewer may activate the application link to gain the access to the backend interview data records. The application link may be activated by simply click the link by the job candidate or the interviewer who receives the application link. After the application link is activated, the job candidate or the interviewer gains the authorization to access the data records created and cached in the backend data management system. In general, a second user interface screen may be displayed on the mobile device of the job candidate or the interviewer. In the second user interface screen, the data records that are created and cached for one or more interviews may be displayed on the mobile device.

Step 130: Retrieving the cached first information from the caching server. One example of Step 130 may include: retrieving the cached first information from the caching server of the data repository of the data management system in response to activation of the application link by the mobile device after the access authorization for accessing the first information is provided, and displaying the cached first information in a user interface of the mobile device. Another example of Step 130 may include: retrieving the cached first information from the caching server of the data repository of the data management system in response to activation of the application link by the mobile device after the access authorization for accessing the first information is provided; displaying the cached first information in a user interface of the mobile device.

After the access authorization is given, the data records for the job candidate or the interviewer may be retrieved from the backend data management system. As provided earlier, in order to expedite the access to data records belong to the particular job candidate or the interviewer, data records may be cached in the caching server in the data management system. Those cached data records may be retrieved when data records are accessed after the application link is activated, The interview data records may be displayed on the mobile device after the data records are retrieved. After the activation of the application link, the data management system may first retrieve the interview data records store in the data repository. The data retrieval may be triggered by a requested generated by the event of activation of the application link. The data retrieval may be either from the cached server or from the relational database stored in the data repository of the data management system. After the data records are retrieved, the data management system may display the data records in the user interface that may be viewed by the job candidate or the interviewer on the mobile device.

Step 140: Generating second information dynamically according to predetermined factors. One example of Step 140 may include: generating second information dynamically according to predetermined factors comprising: the session time and the session locality, and dynamic factors comprising a second time and a second location of the session object, wherein the second information comprises at least one of: mapping information and a temporary queue, and displaying the second information in the user interface of the mobile device. Another example of Step 140 may include: generating second information dynamically according to predetermined factors comprising: the interview time and the interview location, and dynamic factors comprising a second time and a second location of the interviewer, wherein the second information comprises at least one of: mapping information and a hospitability venue; displaying the second information in the user interface of the mobile device.

The job candidate or the interviewer may be provided additional information by the Session App in order to facilitate the interview. Some information may not be available when the job candidate or the interviewer activates the application link to access the interview data records. For example, the traffic information. Also, the job candidate or the interviewer may also want to know the coffee shops nearby the interview location that the job candidate or the interviewer may rest a little bit before the interview starts. Or, the job candidate or the interviewer may need to some options for the restaurants that he or she may eat that are close to the interview location around the interview time. As such, mapping information and a hospitability venue may be provided to the job candidate and the interviewer upon the request from the job candidate and the interviewer. Because the interview time and location may be subject to change, it is preferable to generate hospitability information when the job candidate or the interviewer needs the information. Therefore, the additional information may be generated dynamically.

In order to generate such information dynamically, the data management system may be provided with two types of factors. The first type includes predetermined factors such as the interview time and the interview location. The other type includes dynamic factors such as the time and the location when the job candidate or the interviewer requests for such additional information. The system may utilize the factors provided to generate the addition information dynamically.

The additional information may not be generated directly by the data management system. Even though the data management system may be able to generate the additional information, however, the data management system may also utilize a third party service to generate the additional information. For example, the data management system may integrate with FourSquare that provides the additional information such as hotel, park, pub, sports bar, museum, bar, coffee shop brewery, pizza and restaurant information. After the data management system is able to get such additional information, the data management system may add the additional information to interview data records that the job candidate or interviewer may view the additional information via the screen of their mobile devices.

Step 150: Providing an evaluation and deactivating the application link. One example of Step 150 may include: providing an evaluation, via the user interface, for the candidate token and storing the evaluation in the data repository, and deactivating the application link to revoke the access authorization to the first information and the second information in a pre-determined period after the session time. Another example of Step 150 may include: providing an evaluation, via the user interface, for the job candidate and storing the evaluation in the data repository; and deactivating the application link to revoke the access authorization to the first information and the second information in a pre-determined period after the interview time.

The application link may be deactivated to discontinue the access to data records stored in the data management system to the job candidate or the interviewer. After the interview is conducted, the job candidate or interviewer may no longer need the access to the interview data records stored in the data repository of the data management system. Therefore, the authorization that grants to the job candidate or interviewer to access the interview data records may be revoked. As it may be hard to predict the exact completion time of the interview, the revocation of the authorization to access to the interview data records may take place in a pre-determined period after the interview is conducted. For example, twenty four hours after the scheduled interview time. Or alternatively, the revocation may take place at any pre-determined time period after the interview is conducted. After the application link is deactivated, the job candidate or the interviewer may not view the data records in the data management system. For the interviewer, the evaluation for the job candidate may be provided after the job interview. The evaluation may be presented to the interviewer to complete and the completed evaluation may be stored in the data repository.

The method illustrated by FIG. 1 may also include an additional step of sending a user notification. The user notification may be sent automatically when at least one of the following events occurs: a system use exceeds an overflow threshold and/or the system maintenance. Such notifications may be generated automatically by the data management system when a user notification is needed. For example, the user notification is generated when the system use exceeds an overflow threshold (95% CPU utilization is reached or the disk space is 90% full). Also, the scheduled system maintenance or upgrade may also trigger the generation of the user notifications. In addition, when the interview schedule is cancelled or the interview time/location is changed, the user notifications may also be needed. The user notifications may either be generated automatically or generated manually by the super user of the system such as recruiters or administrators of the system.

There may be multiple ways to display the user notifications to the user. One way may be to send an instant message to the job candidate or the interviewer. The notification message may be also displayed in the user interface of the Session App. The system may also generate a phone call to the job candidate or the interviewer. Other notification means may be used to notify the job candidate or the interviewer of the Session App. Those notification means may either be currently known or later developed. Those notification means are within the scope of the present disclosure.

The interview data records may be created by selecting existing data records. The interview data records stored in data repository of the data management system for one interview may be generated by choosing a subset of interview data records from existing interview data records in the system. For example, if a job candidate is scheduled for more than one interview for one day, the interview date and resume may be the same for all interviews for that day. The newly generated data records may be created by copying from those that exist in the system. Also, if the interviewer needs to conduct an interview for the same job for multiple times, the job description for the later interview may be copied from a previous interview.

Alternatively, interview data records for multiple interviews may be created at the same time with the shared information. For example, there are multiple interviewers for one interview, the resume, job description and interview tips may be created at once for all interviewers in the backend system. The interviews may also be able to access those interview data records at the same time. Not all interview data records can be shared, therefore, only those data records are shareable may be selected and copied from existing interviews for the new interviews.

The Session App supports the different language displays and automatically time zone adjustment. The backend data management system allows the selection from various languages for the user display when the interview data records are created for one interview. Because the Session App enables the interview is conducted remotely between the job candidate and one or more interviewers via video conferences, it is possible that the job candidate and the interviewer are in different time zones. Therefore, the Session App may calculate the correct local time based on the location of the mobile device and display the correct local time to the job candidate and/or the interviewer.

Both the job candidate and the interviewer may provide feedback for the interview by using the Session App before the application link is deactivated. In case for the job candidate, the feedback may be an option to provide. For example, the job candidate may rate the Session App or the interview experience by selecting pre-determined answers for a number of questions. The feedback may also be input as a free text format via the user interface on the mobile device. In case for the interviewer, the interviewer may have to provide the evaluations for the job candidate. The evaluations may be pre-formatted such that the interviewer may provide rankings for the job candidate for various categories. The evaluations may also be provided in the free text format via the user interface on the mobile device. The evaluations may be provided by both pre-formatted feedback and free text format.

The initial application link sent to the job candidate or the interviewer after the interview is created in the backend data management system may be displayed in a different user interface that is generated for the job candidate or the interviewer to view the interview data records. As an example, the application link may be displayed in a standard interface displayed on the mobile device such as SMS, email, and/or WeChat or other social medial applications that run on the mobile device. The user interface for viewing the interview data records may be a separated designed interface that is tailed for the Session App. For example, a webpage that is developed and can be displayed on the mobile device.

The Session App supports the interview to be conducted at different interview locations. As such, a video connection between the user interface and the job interview via the mobile device may be established. The video may utilize a third party tool such as skype or similarly functioned applications. The video connection may enable the job candidate and the interviewer to see each other and talk to each other.

In addition to the video connection, when the interview is conducted remotely, the interview data records may also be provided to the job candidate or the interviewer for the interview. For example, the profile of the job candidate may be displayed on the mobile device of the interviewer while the interview is conducted via the video connection. The job candidate and the interviewer may also chat with each other via an instant messaging system. The instant messaging system may be a third party tool or separated developed chatting applications.

Multiple interviews may be displayed on the mobile device at once. As the multiple interviews for either the job candidate or the interviewer are possible. The Session App may select interview data records and cached the interview data records and display the data records on the user interface of the mobile device at the same time.

The user interface of the mobile device may display an expandable list. The expandable list may have the list of categories that may include an agenda, interview details, an interviewer, a video interview, job details and tips from a recruiter. The agenda may be expanded to show the interview time schedule. In case for the job candidate, the interviewer may be expanded to show the interviewer's profile. In case for the interviewer, the candidate profile may be shown when the job candidate is expanded. Also, the tips from the recruiter for the job candidate may show possible questions asked by the interviewer and suitable answers to the questions to be provided in the job interview. The elevator moments for the interviewer may show the questions the interviewer may ask during the interview and the answers may also be shown in the user interface on the mobile device. The expandable list of categories may further include interview location details that may show a direction to the interview location and a map showing the interview location.

The backend data management system may include a user interface. The backend data management system may provide a backend user interface that allows the data records associated with the job interview to be entered into the data management system. Further, the data validation function may be established within data management system such that the data records are validated to check for potential errors when the data records are entered into the system via the backend user interface. Such data errors may include spelling errors, or the data records entered do not comply with the rules established in the data management system. For example, the email and cell phone must exist for either the job candidate or the interviewer.

The backend data management system may comprise multiple servers. For example, one system architect for the backend data management system may comprise three servers: a web application server, a database server and a caching server. Among them, the web application server may be used as both a web proxy server and an application server.

Figure 2:
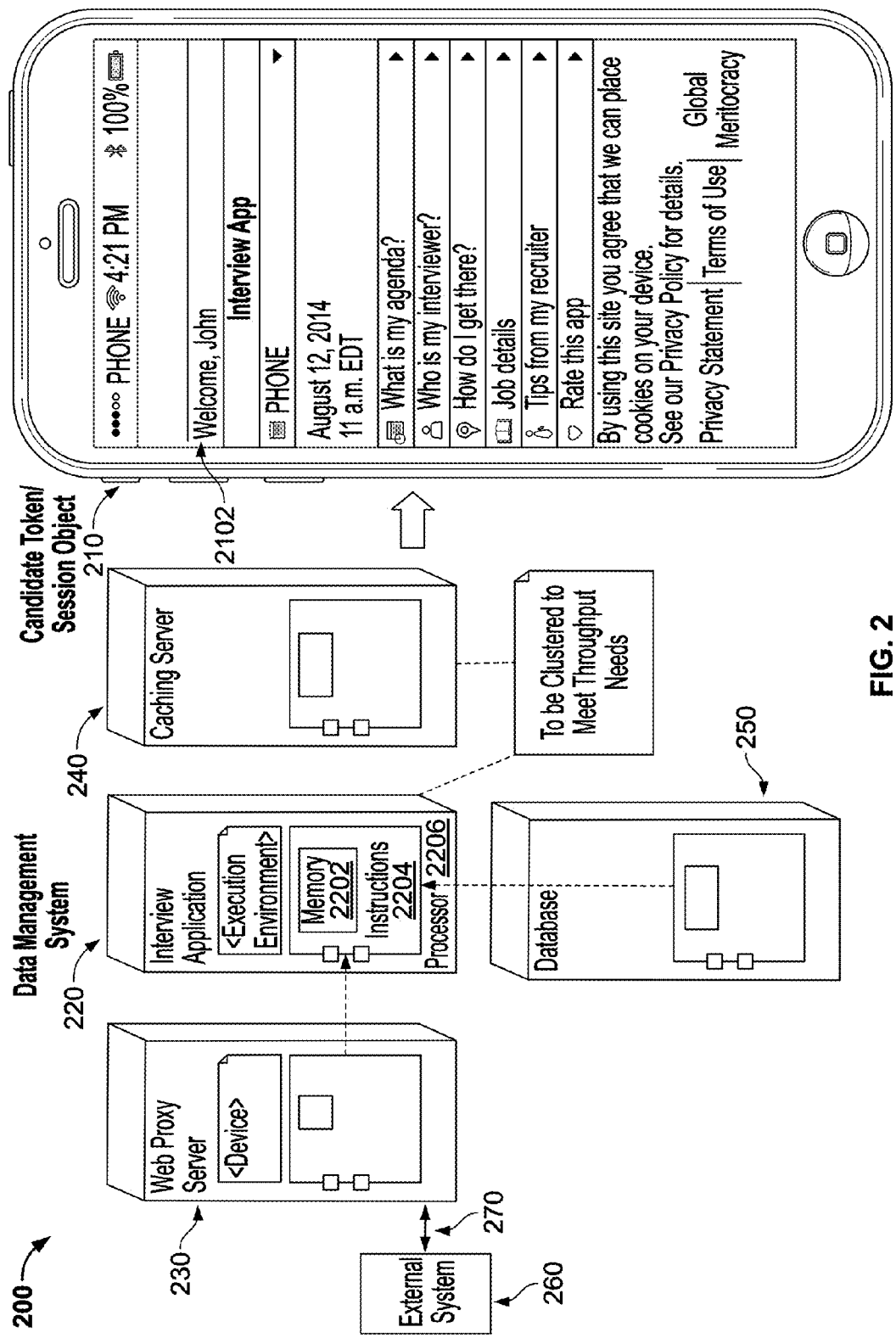
FIG. 2 illustrates a system for providing access on a mobile device to aggregated data associated with a session.

FIG. 2 illustrates a system 200 for providing access on a mobile device to aggregated data associated with a session. As shown in FIG. 2, the system 200 includes a mobile device 210 having a user interface 2102, a caching server 240, an application server 220, a data base 250, a web server 230 and one or more external systems 260. The components of the system 200 may be communicated via a data communication network 270.

As shown in FIG. 2, the system 200 includes memory 2202 as non-transitory computer readable medium, processor 2206 and instructions 2204 that are stored in the memory 2204. The instructions 2204 when executed may cause the processor 2206 to: populate data records of a data repository 250 of a data management system from an external data system 260, where the external data system may include locations and personnel identifications, generate first information in the data records stored in the data repository 250 by associating a session identification with the session object, and selecting a session time, a session locality and candidate token information, cache the first information stored in the data repository on a caching server 240, create an application link to be displayed in a mobile device 210, where the application link may enable the access to the cached first information that is stored in the data repository 250, provide an access authorization to the mobile device 210 for accessing the first information by activating the application link displayed on the mobile device 210, retrieve the cached first information from the caching server 240 of the data repository of the data management system in response to activation of the application link by the mobile device after the access authorization for accessing the first information is provided, display the cached first information in a user interface 2102 of the mobile device 210, generate second information dynamically according to predetermined factors comprising: the session time and the session locality, and dynamic factors comprising a second time and a second location of the session object, where the second information may include at least one of: mapping information and a temporary queue, display the second information in the user interface 2102 of the mobile device 210, provide an evaluation, via the user interface 2102, for the candidate token and store the evaluation in the data repository 250, and deactivate the application link to revoke the access authorization to the first information and the second information in a pre-determined period after the session time.

The system may include a processor such as the processor 2206 shown in FIG. 2 and a non-transitory computer readable medium such as memory 2202 storing computer instructions such as instructions 2204 that may be configured to cause the processor 2206 to: populate data records of a data repository 250 of a data management system from an external data system 260 of an enterprise, where the external data system 260 may include locations and personnel of the enterprise; generate first information in the data records stored in the data repository 250 by associating an identification of the job candidate with an interview time, an interview location and interviewer information; cache the first information stored in the data repository 250 on a caching server 240; create an application link to be displayed in a mobile device 210, wherein the application link enables the access to the cached first information that is stored in the data repository 250; provide an access authorization to the mobile device 210 for accessing the first information by activating the application link displayed on the mobile device 210; retrieve the cached first information from the caching server 240 of the data repository 250 of the data management system in response to activation of the application link by the mobile device 210 after the access authorization for accessing the first information is provided; display the cached first information in a user interface 2102 of the mobile device 210; generate second information dynamically according to predetermined factors comprising: the interview time and the interview location, and dynamic factors comprising a second time and a second location of the job candidate, wherein the second information comprises at least one of: mapping information and a hospitality venue; display the second information in the user interface 2102 of the mobile device 210; provide an evaluation, via the user interface 2102, for the job candidate and store the evaluation in the data repository 250, and deactivate the application link to revoke the access authorization to the first information and the second information in a pre-determined period after the interview time.

The system illustrated in FIG. 2 may send a system notification automatically to the mobile device 210 when the first information is not available due to at least one of: a system use exceeds an overflow threshold and system maintenance.

The system shown in FIG. 2 also may create the first information for the interview by selecting at least a subset of information of a second interview associated with the identification of the job candidate or the interviewer from the data repository 250 of the data management system.

The data management system shown in FIG. 2 may also include a language support that provides a user selectable non-English language to be displayed in the user interface 2102 of the mobile device 210.

The system in FIG. 2 may provide an input field on the user interface of the mobile device 210 to allow submission of feedback from the user interface of the mobile device.

The mobile device 210 shown in FIG. 2 may display the application link in a standard web application such as SMS, email, or other social media applications run on the mobile device 210. The standard web application may be different from the Session App where the interview data records in the Session App may be displayed in a specially designed webpage on the mobile device 210 of the job candidate or the interviewer.

The system shown in FIG. 2 may also enable the establishment of a video connection between the job candidate and the interviewer. The video connection may be established via a third party tool such as skype. The job candidate and the interviewer may conduct the interview via the video connection. The job candidate and the interviewer may see each other from different locations or talk to each other. The instant messaging tool may also be used during the interview.

Because multiple interviews are possible for either the job candidate or the interviewer, the user interface on the mobile device shown in FIG. 2 may display interview data records for multiple interviews by selecting relevant data records from the data management system.

The user interface 2102 on the mobile device 210 shown in FIG. 2 may display an expandable list of categories comprising an agenda, interview details, an interviewer, a video interview, job details and tips from a recruiter. Among them, for the job candidate, the agenda may comprise an interview time schedule, the interviewer may comprise an interviewer profile; and the tips from the recruiter may comprise questions asked by the interviewer and suitable answers to the questions to be provided in the job interview. For the interviewer, the elevator moments may be included. The elevator moments may include the questions the interviewer may ask during the interview and the answers. The job candidate profile may be provided to the interviewer. The expandable list of categories may further include interview location details that may show a direction to the interview location and a map showing the interview location.

The data management system shown in FIG. 2 may include a backend user interface that allows the data records associated with the job interview to be entered into the data management system. Also, the data management system may establish one or more data validation functions with instructions to be executed by one or more processor on the backend server to validate the data records entered from the backend user interface.

The data management system shown in FIG. 2 may be configured with one or more servers. One example of the configuration for the backend data management system may be to include three servers: a web application server 220, a database server 250 and a caching server 240. The web application server may be used as both a web proxy server and an application server.

Figure 3:
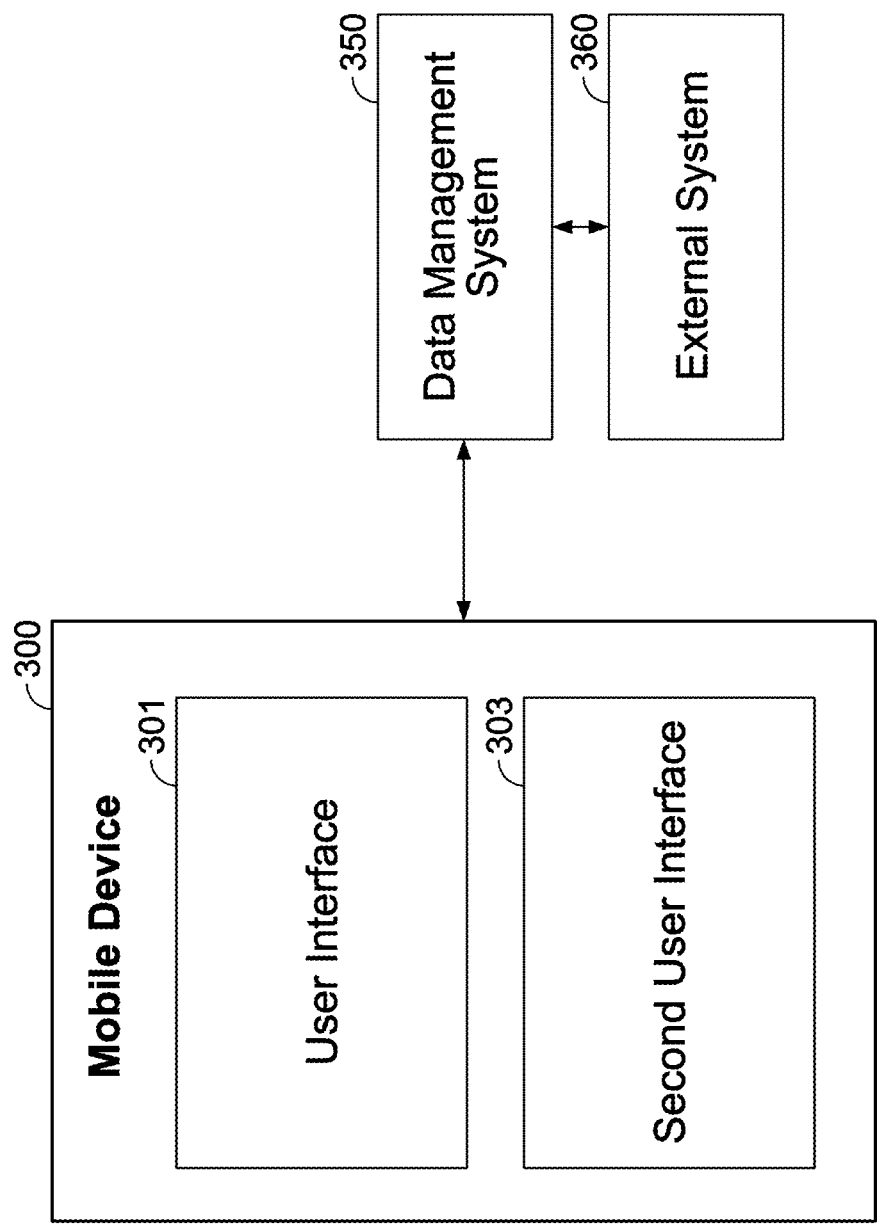
FIG. 3 illustrates a mobile device having a user interface for providing access to the mobile device to aggregated data associated with a session.

FIG. 3 illustrates a mobile device having a user interface 301 for providing access to the mobile device 300 to aggregated data associated with a session. According to FIG. 3, a mobile device 300 for providing access on the mobile device for a candidate token to aggregated data associated with a session, comprising a user interface 301 that is configured to: display an application link in the mobile device 300, where the application link may enable the access to first information that is stored in a data repository of a data management system 350, where the data management system 350 may populate data records of the data repository from an external data system 360, the external data system comprising locations and personnel identifications, activate the application link displayed on the mobile device to gain an access authorization for accessing the first information stored in the data repository that is generated in the data records stored in the data repository by associating an identification with the session object, and selecting a session time, a session locality and candidate token information, where the first information may be cached in a caching server, retrieve the cached first information from the caching server of the data repository of the data management system 350 in response to activation of the application link by the mobile device 300 after the access authorization for accessing the first information is provided, display the cached first information in a user interface 301 of the mobile device 300, receive second information that is dynamically generated according to predetermined factors and dynamic factors wherein the predetermined factors comprise: the session time and the session locality, and the dynamic factors comprise: a second time and a second location of the session object, and wherein the second information comprises at least one of: mapping information and a temporary queue, display the second information in the user interface 301 of the mobile device 300, receive an evaluation, via the user interface, for the candidate token and store the evaluation in the data repository, and indicate that the application link is deactivated to revoke the access authorization to the first information and the second information in a pre-determined period after the session time.

According to FIG. 3, a mobile device 300 is provided for providing access to the mobile device for aggregating data for a job candidate in an interview. The programs may be developed and stored on both the mobile device 300 and the data management system 350 for the mobile device 300 to aggregated data for the interview. The programs may be executed by one or more processors on the mobile device 300 that cause the processor on the mobile device to: display an application link in the mobile device 300, where the application link enables the access to first information that is stored in a data repository of a data management system 350, wherein the data management system populates data records of the data repository from an external data system 360 of an enterprise, the external data system 360 comprising locations and personnel of the enterprise, activate the application link displayed on the mobile device to gain an access authorization for accessing the first information stored in the data repository that is generated in the data records stored in the data repository by associating an identification of the job candidate with an interview time, an interview location and interviewer information, where the first information is cached in a caching server, retrieve the cached first information from the caching server of the data repository of the data management system in response to activation of the application link by the mobile device 300 after the access authorization for accessing the first information is provided, display the cached first information in a user interface 301 of the mobile device 300, receive second information that is dynamically generated according to predetermined factors and dynamic factors wherein the predetermined factors comprise: the interview time and the interview location, and the dynamic factors comprise: a second time and a second location of the job candidate, and wherein the second information comprises at least one of: mapping information and a hospitability venue; display the second information in the user interface 301 of the mobile device 300, receive an evaluation, via the user interface 301, for the job candidate and store the evaluation in the data repository, and indicate that the application link is deactivated to revoke the access authorization to the first information and the second information in a predetermined period after the interview time.

The user interface shown in FIG. 3 that may be built by computer programs that run on the mobile device by executing the computer programs by one or more processors of the mobile device. The user interface may display a system notification automatically on the mobile device when the first information is not available due to at least one of: a system use exceeds an overflow threshold and system maintenance.

The mobile device shown in FIG. 3 may display the interview related information that may be generated by selecting at least a subset of information of a second interview associated with the identification of the job candidate from the data repository of the data management system. Also, the interview related information may be generated by selecting the data records in the data repository for a plurality of interviews.

The user interface shown in FIG. 3 may display a user selectable non-English language that is provided by the data management system. Also, the user interface may display the application link in in a second user interface 303 on the mobile device 300 wherein the second user interface 303 is different from the user interface 301 on the mobile device 300 to display the first information and the second information.

The user interface shown in FIG. 3 may further provide a video connection between the user interface on the mobile device and an external user interface of an external user terminal that allows the video connection to be used to conduct the interview remotely.

The mobile device 300 shown in FIG. 3 may also have programs to be executed to provide an input field on the user interface 301 of the mobile device 300 to allow submission of feedback from the user interface of the mobile device.

The user interface 301 of the mobile device 300 shown in FIG. 3 may display an expandable list of categories comprising an agenda, interview details, an interviewer, a video interview, job details and tips from a recruiter. Among them, the agenda may comprise an interview time schedule, the interviewer may comprise an interviewer profile; and the tips from the recruiter may comprise questions asked by the interviewer and suitable answers to the questions to be provided in the job interview. The expandable list displayed in the user interface may comprise interview location details comprising a direction to the interview location and a map showing the interview location.

Figure 4:
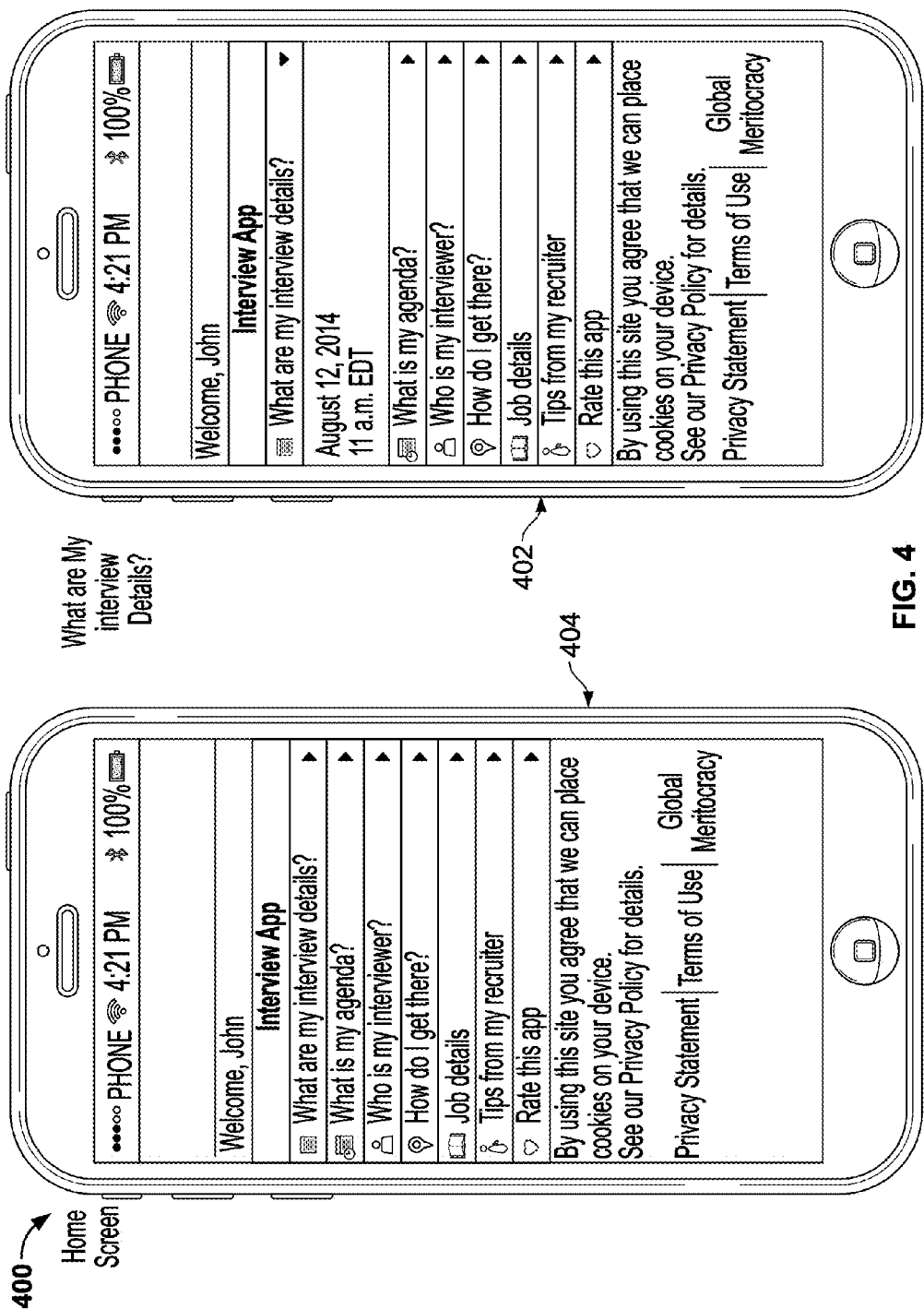
FIG. 4 shows an example of the user interface displayed the home screen and interview details for a candidate token on the mobile device for the session.

FIG. 4 shows an example of the user interface displayed the home screen and interview details for a candidate token on the mobile device for the session 400. Session details may be interview details 402 on the mobile device for the job interview as shown in FIG. 4. The home screen 404 may be the first screen that a candidate token such as a job candidate may see after the application link is activated and the access to the Session App (may be referred as Interview App) is provided to the job candidate. The home screen 404 may provide a list showing what the Session App may provide. For example, as shown in FIG. 4, the interview date/time may be viewed under dropdown list of "[w]hat are my interview details?"

Figure 5:
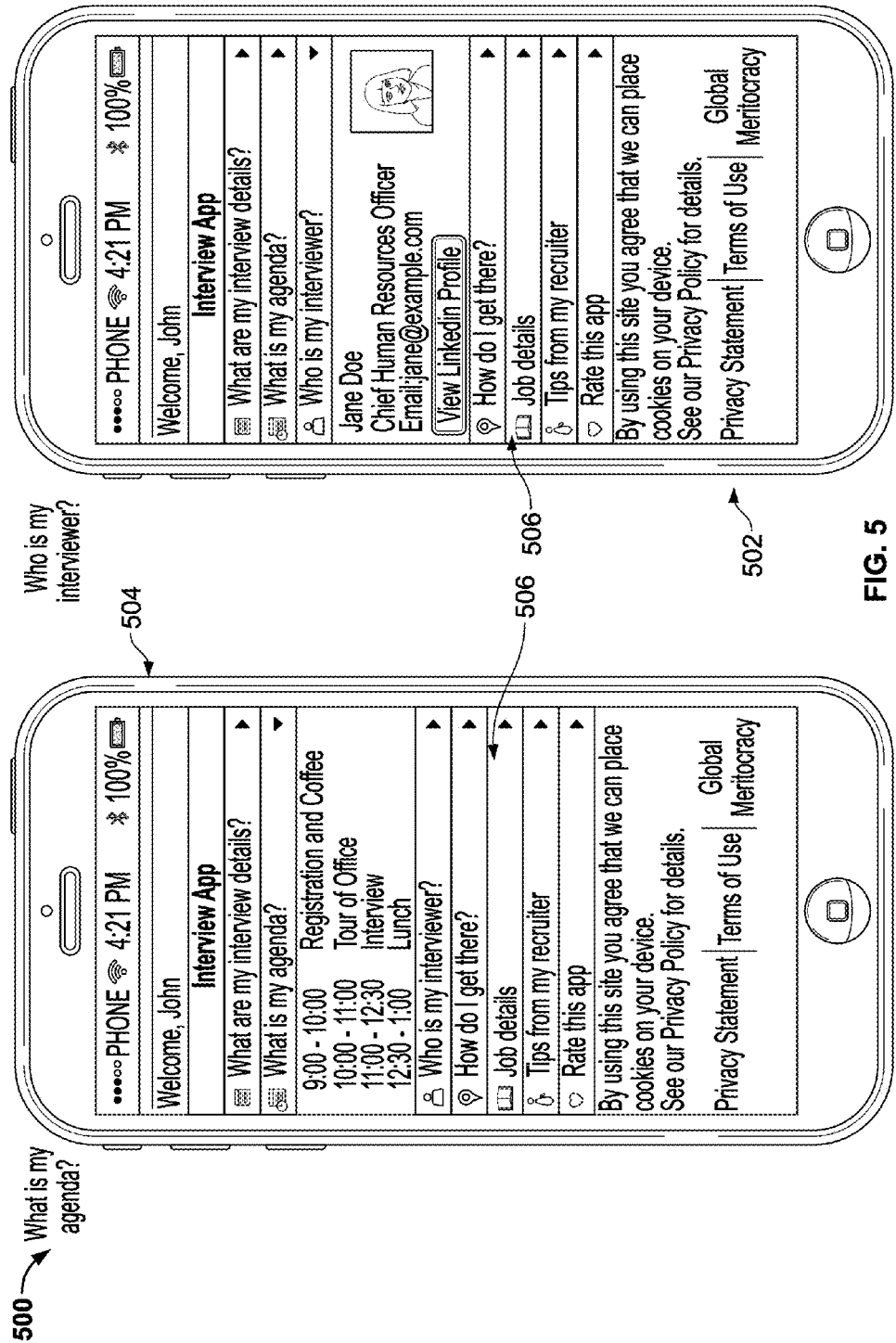
FIG. 5 shows an example of the user interface displayed the agenda and the session object on the mobile device for the session.

FIG. 5 shows an example of the user interface displayed the agenda and the session object on the mobile device for the session 500. As shown in FIG. 5, the session may be a. job interview, and a session object may be an interviewer The user interface displayed the agenda 504 and the interviewer 502 on the mobile device may be for the job interview. The dropdown list 506 may also show the interview agenda and the interviewer details for the interview as shown in FIG. 5.

Figure 6:
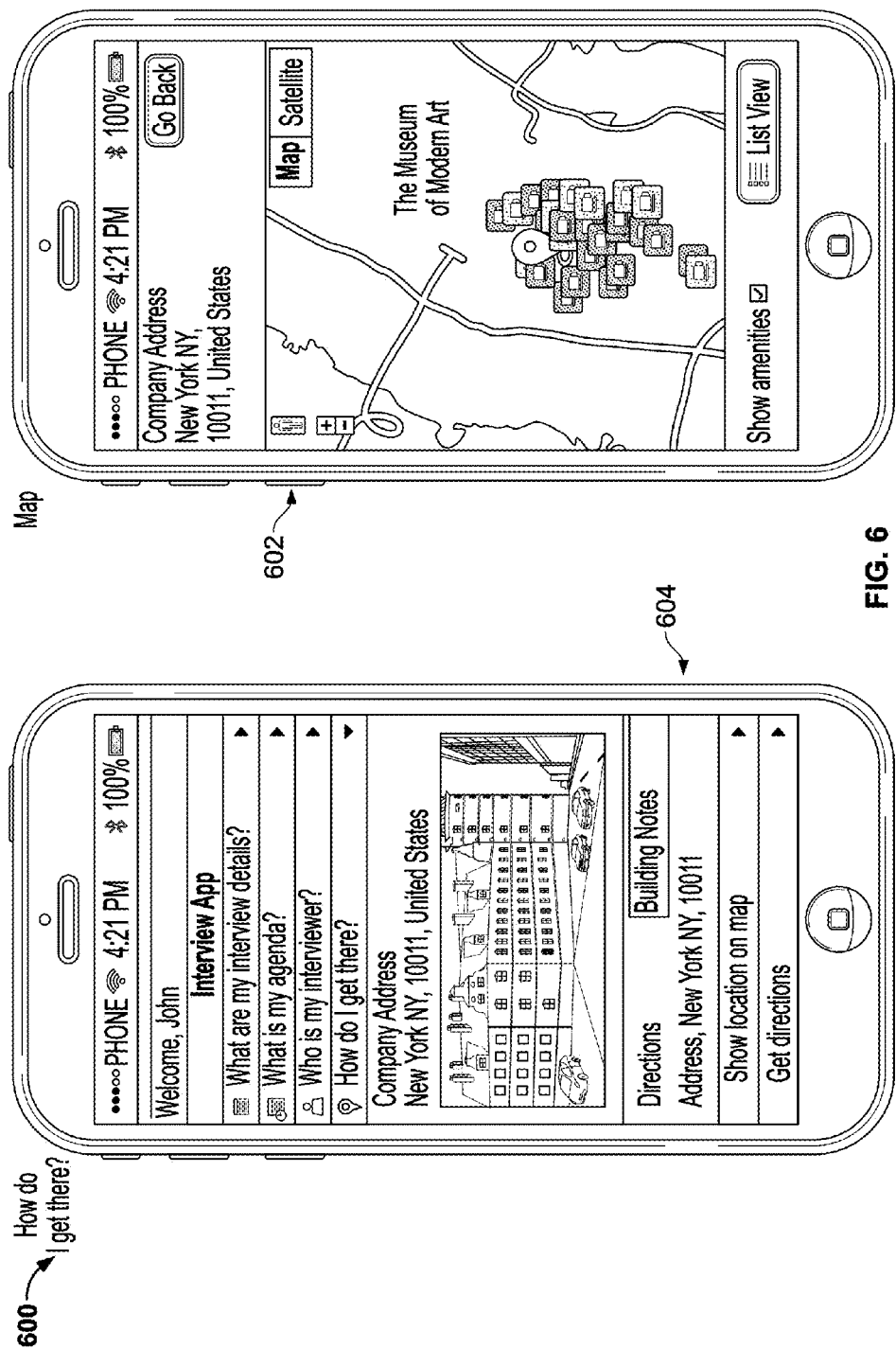
FIG. 6 shows an example of the user interface displayed the direction and map on the mobile device for the session.

FIG. 6 shows an example of the user interface displayed the direction and map on the mobile device for the session 600. The Session App may show the direction to the session such as interview location with the map of the interview location 602. FIG. 6 provides an example of showing the direction with the map 602 of the interview location 604 that is provided by the user interface of the Session App on the mobile device.

Figure 7:
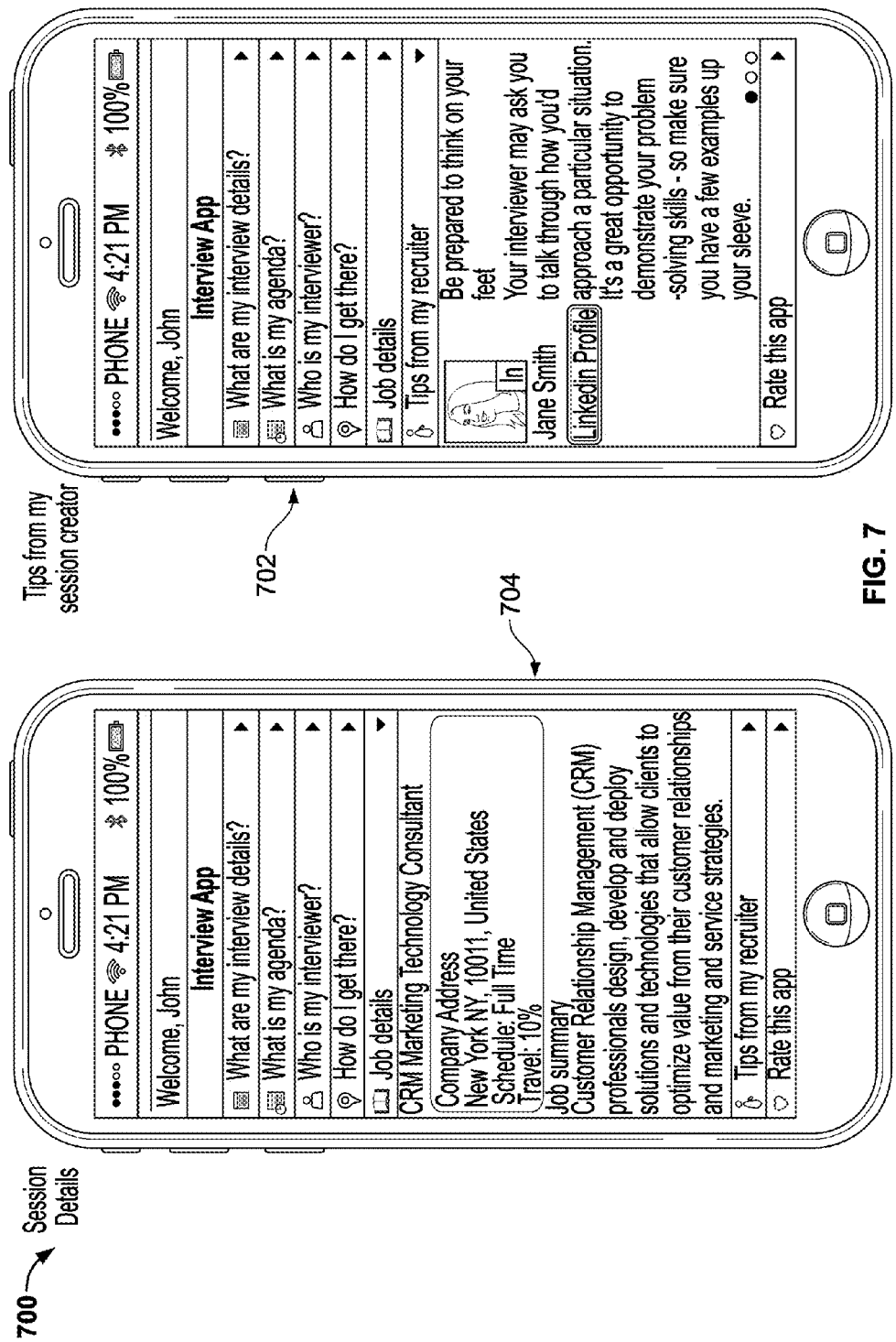
FIG. 7 shows an example of the user interface displayed the session details and session tips on the mobile device for the session.

FIG. 7 shows an example of the user interface 700 displayed the session details such as job details 704 and session tips 702 such as interview tips on the mobile device for the candidate token (job candidate for example) in the session (job interview for example). Job details shown in the user interface may include the job summary and the job requirements. The job requirements may include the job location, the travel requirement and job schedule. In addition, tips for the job candidate to conduct the interview may also be provided in the user interface of the Session App (Interview App for example). For example, the user interface may show the picture or the interviewer's profile, and also the user interface may display information to remind the job candidate what the interview may ask first in the interview.

Figure 8:
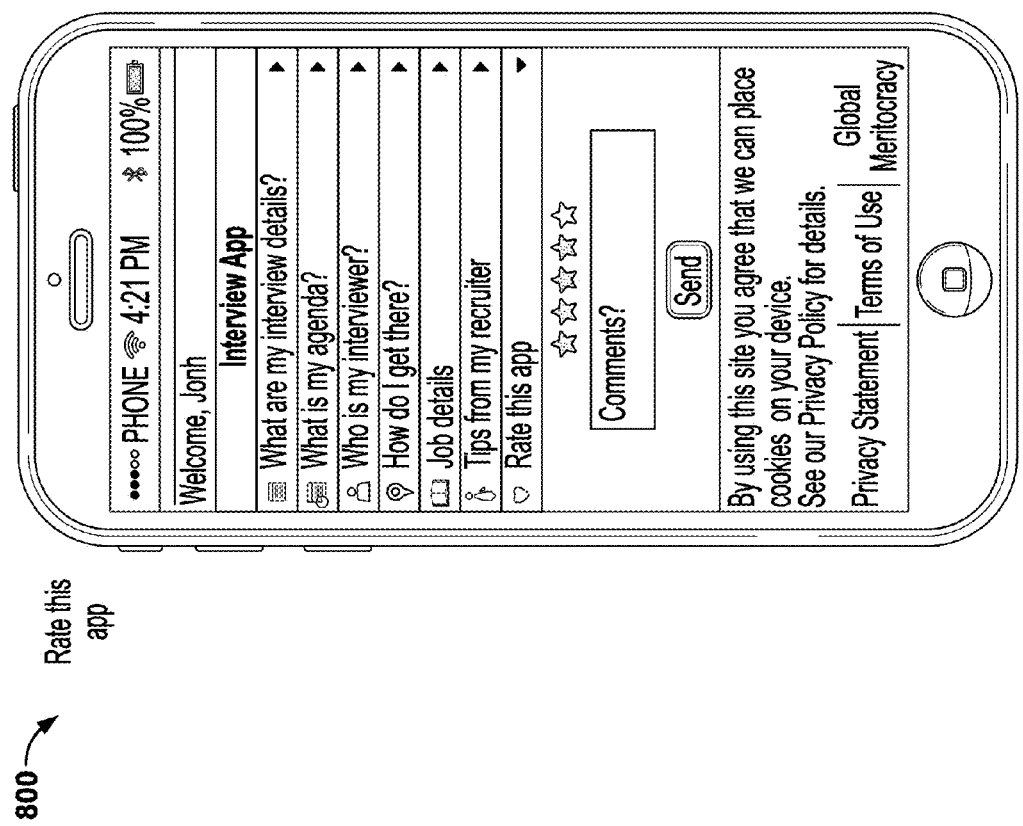
FIG. 8 shows an example of the user interface that accepts ratings for the Session App on the mobile device for the session.

FIG. 8 shows an example of the user interface that accepts ratings for the Session App on the mobile device for the session such as job interview 800. The job candidate may provide a rating through the user interface of the Session App to rate the Session App and provide feedbacks via a free text dialog box provided by the user interface.

Figure 9:
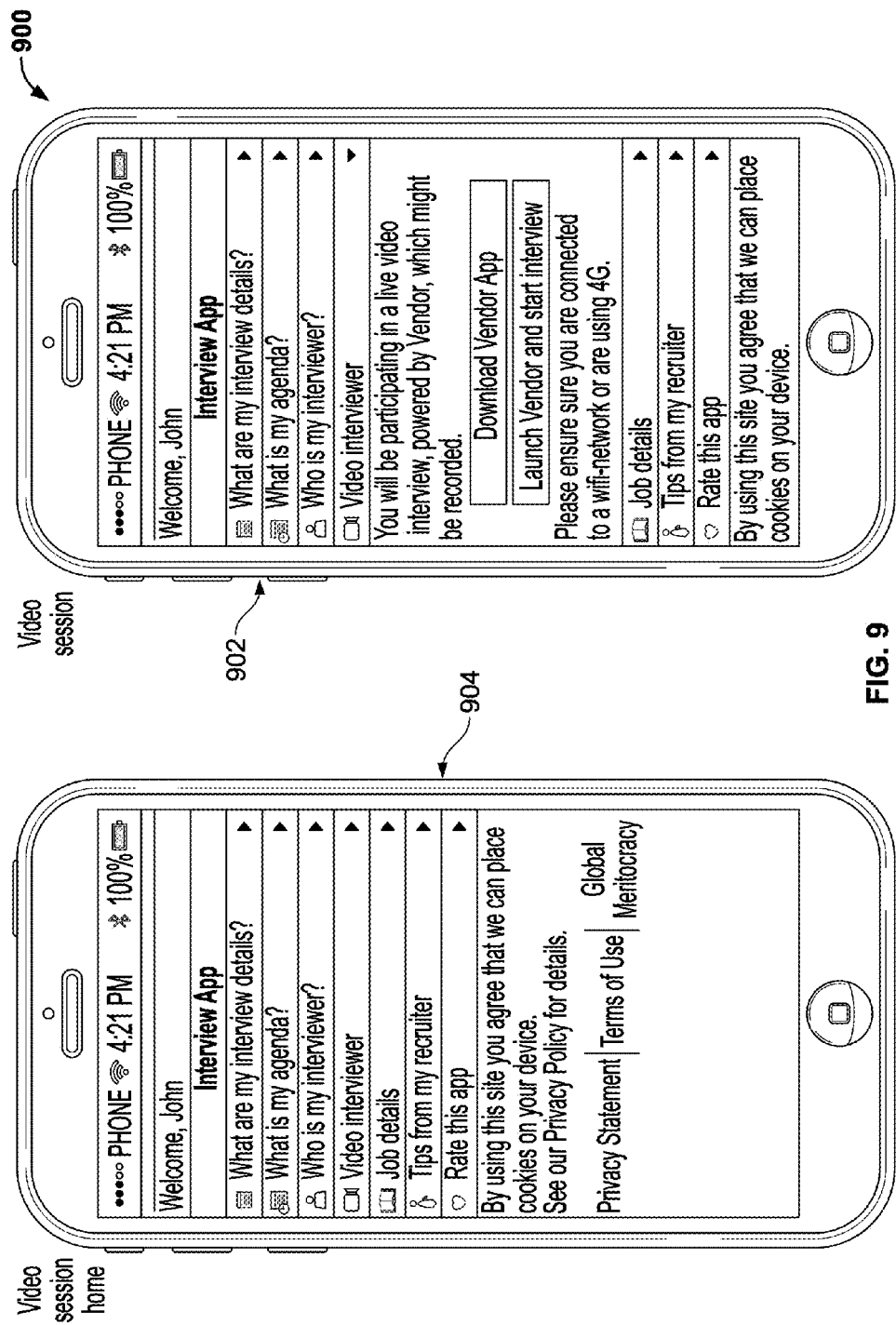
FIG. 9 shows an example of the user interface displayed the video session home and video session on the mobile device for the session.

FIG. 9 shows an example of the user interface displayed the video session home and video session, such as interview home and video interview, on the mobile device for the candidate token (job candidate) in the session (job interview) 900. The Session App (Interview App) may enable the job candidate to conduct the interview via the video connection by using the mobile device. The mobile device may establish the video connection 902 through the third party tool such as HireVue App as shown FIG. 9. The Session App may direct the job candidate to establish the video connection by providing instructions on the user interface 904.

Figure 10:
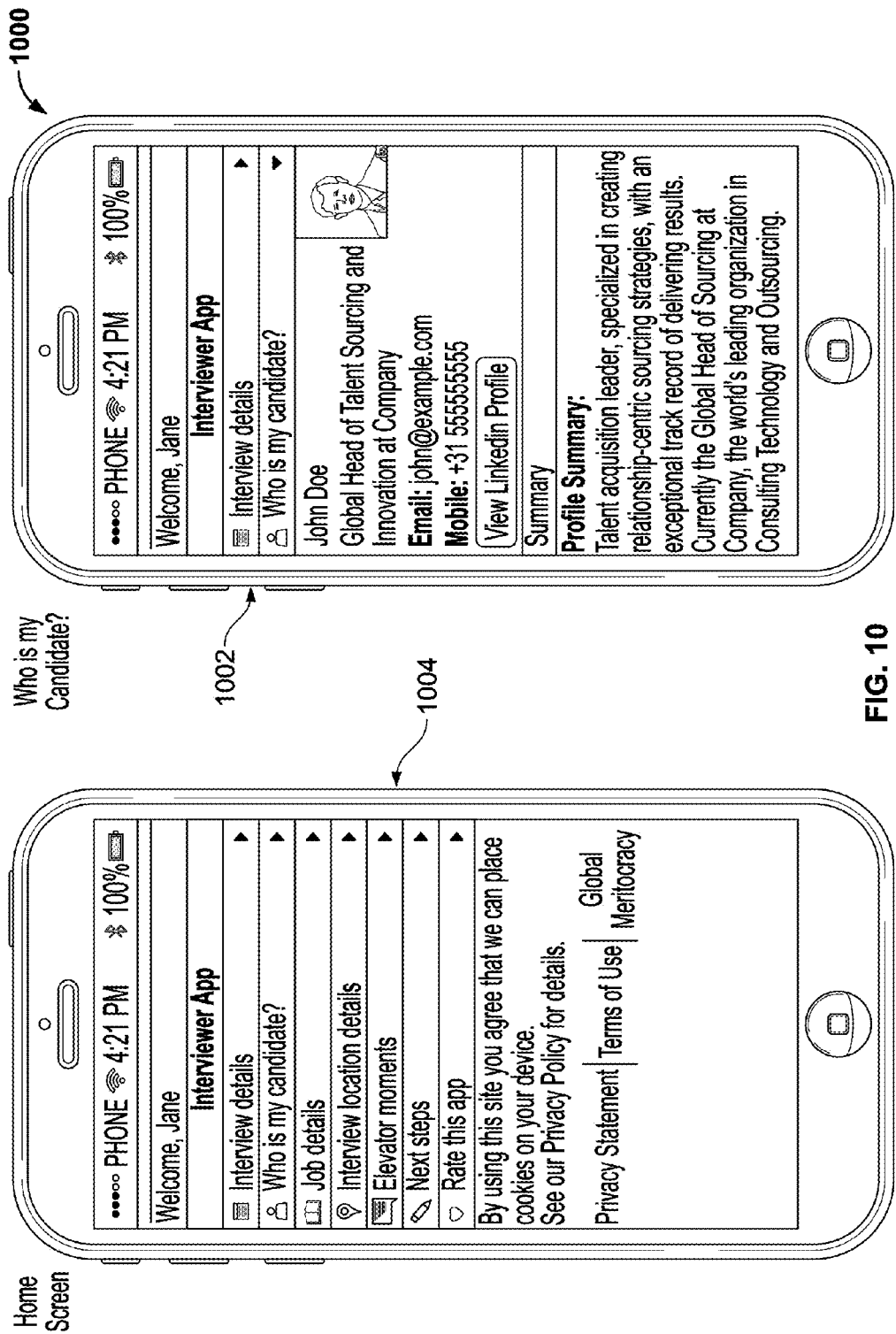
FIG. 10 shows an example of the user interface for he session object to be displayed as the session object's home screen.

FIG. 10 shows an example of the user interface 1000 for the session object (interviewer) to be displayed as the session object's (interviewer's) home screen 1004. As shown in FIG. 10, the job candidate for the interviewer may be displayed in the user interface 1002 for the interviewer in the job interview. The job candidate's profile summary may also be displayed as shown in FIG. 10.

Figure 11:
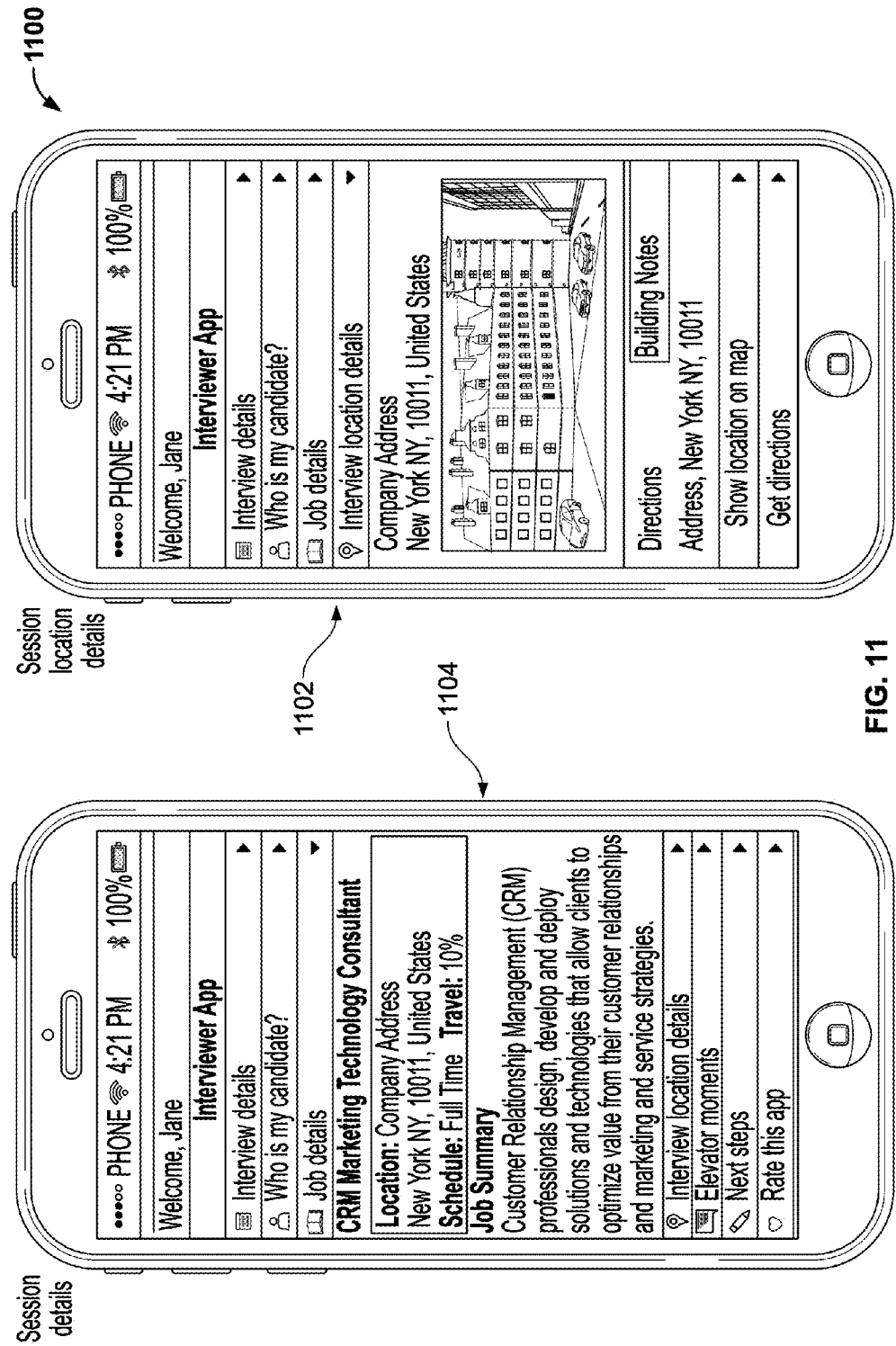
FIG. 11 shows an example of the user interface displayed session details and session location details on the mobile device for the session object in the session.

FIG. 11 shows an example of the user interface 1100 displayed session details 1102 and session location details 1104 on the mobile device for the session. The session details may include job details as shown in FIG. 11 that may be intended for the interviewer. The display shown in FIG. 11 appears similar as the session details shown in FIG. 7 for the job candidate. In FIG. 11 and FIG. 7, both job summary and job requirements are shown in the session details display in the user interface 1104. In addition, the interview location may be useful for the interviewer because a lot of interviewers may not be conducting the interviews at their working location. The interviewer's screen shown in FIG. 11 also provides the session location details 1102.

Figure 12:
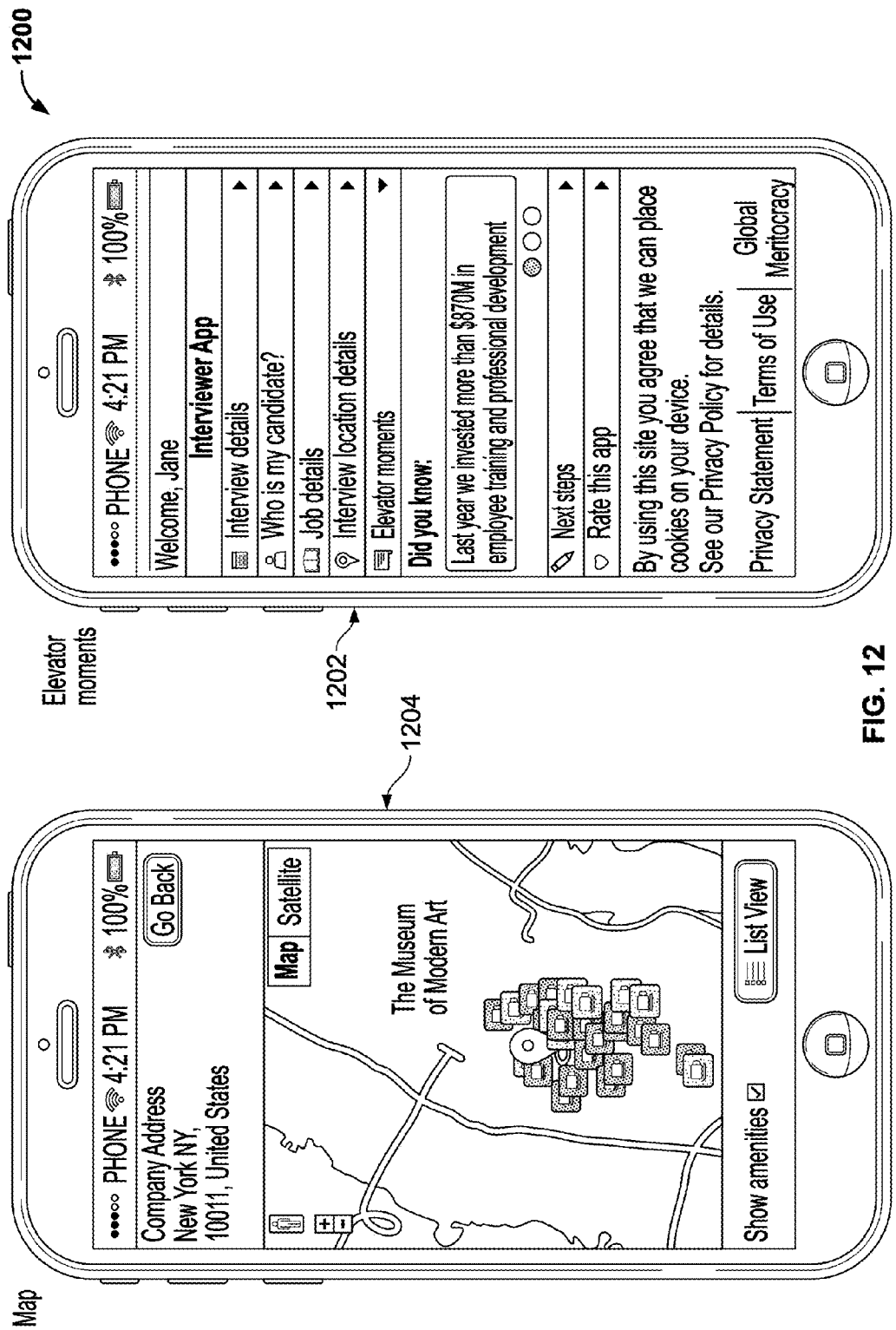
FIG. 12 shows an example of the user interface displayed the map and elevator moments on the mobile device for the session.

FIG. 12 shows an example of the user interface 1200 displayed the map 1204 and elevator moments 1202 on the mobile device for a session (a job interview for example). The map display as shown in the user interface in FIG. 12 for the interviewer appears similar to the map display for the job candidate as shown in FIG. 6. However, the Session App (Interview App) for the interviewer may provide the elevator moments in the user interface for the interviewer. For example, the user interface displays "Do you know:" and displays the answer: "Last year our company invested more $870 M in employee training and professional development."

Figure 13:
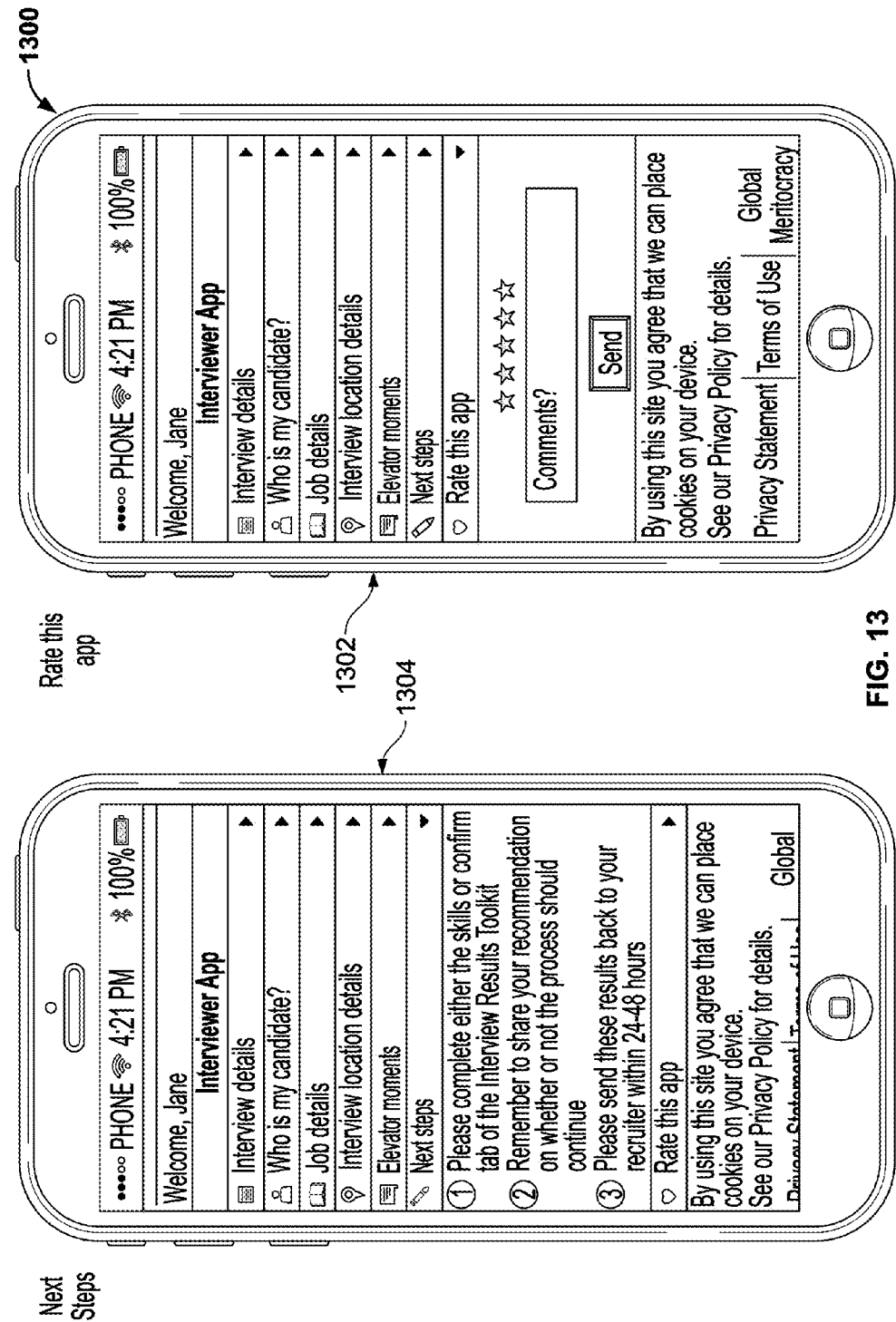
FIG. 13 shows an example of the user interface displayed next steps and the user interface to rate the app on the mobile device for the session.

FIG. 13 shows an example of the user interface 1300 displayed next steps 1304 and the user interface to rate the app 1302 on the mobile device for the session (the job interview). The Session App (Interview App) may provide the instructions to direct the interviewer to perform the interview. For example, the user interface for the interviewer may show next steps after the interview is conducted. For example, the interviewer is asked to send the interview results back to the recruiter within 24-48 hours. The user interface may also accept the rating from the interviewer for the Session App. The interviewer may rate the Session App by pre-determined star level or by typing comments in the free text space in the user interface.

Figure 14B:
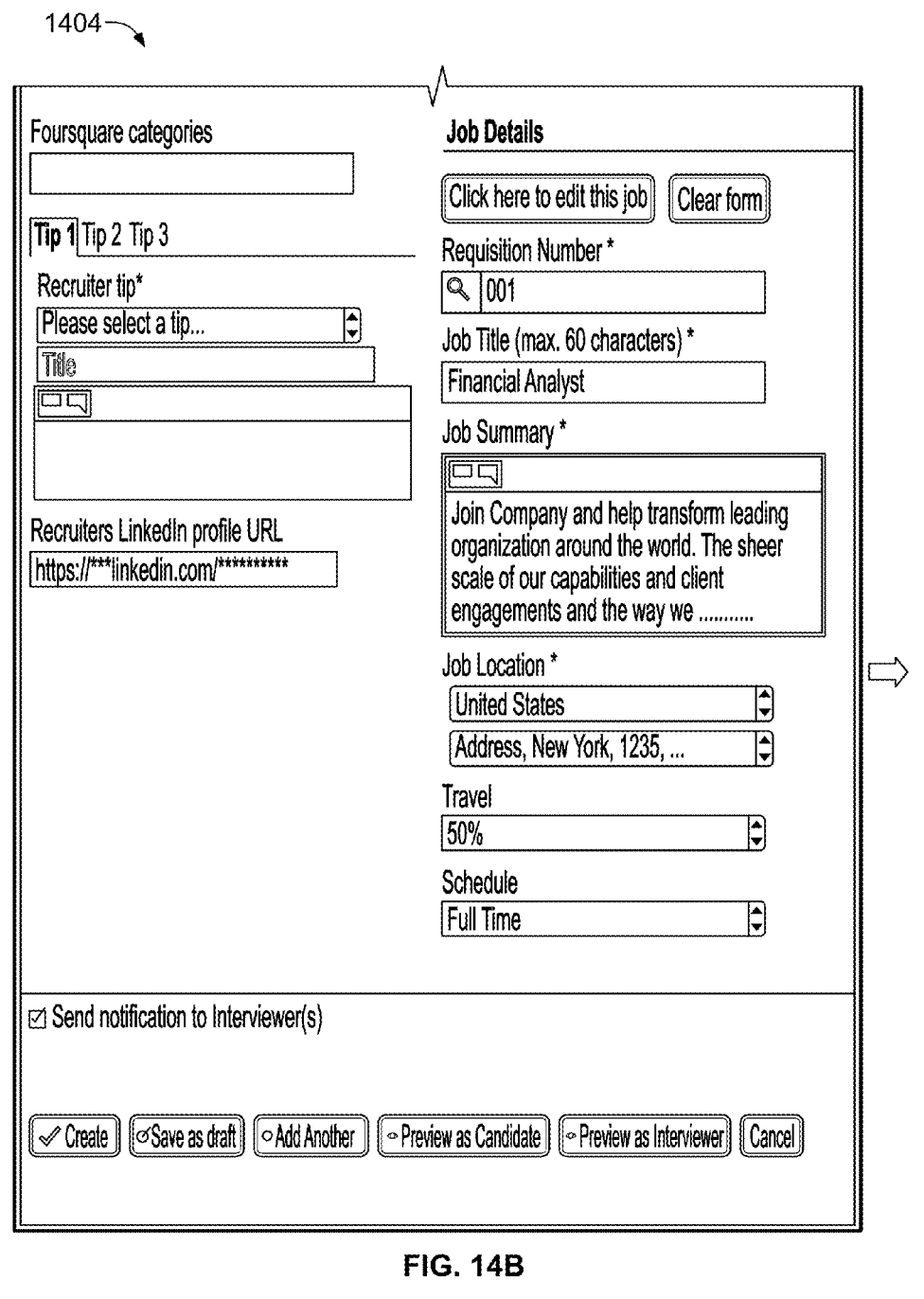
Figure 14C:
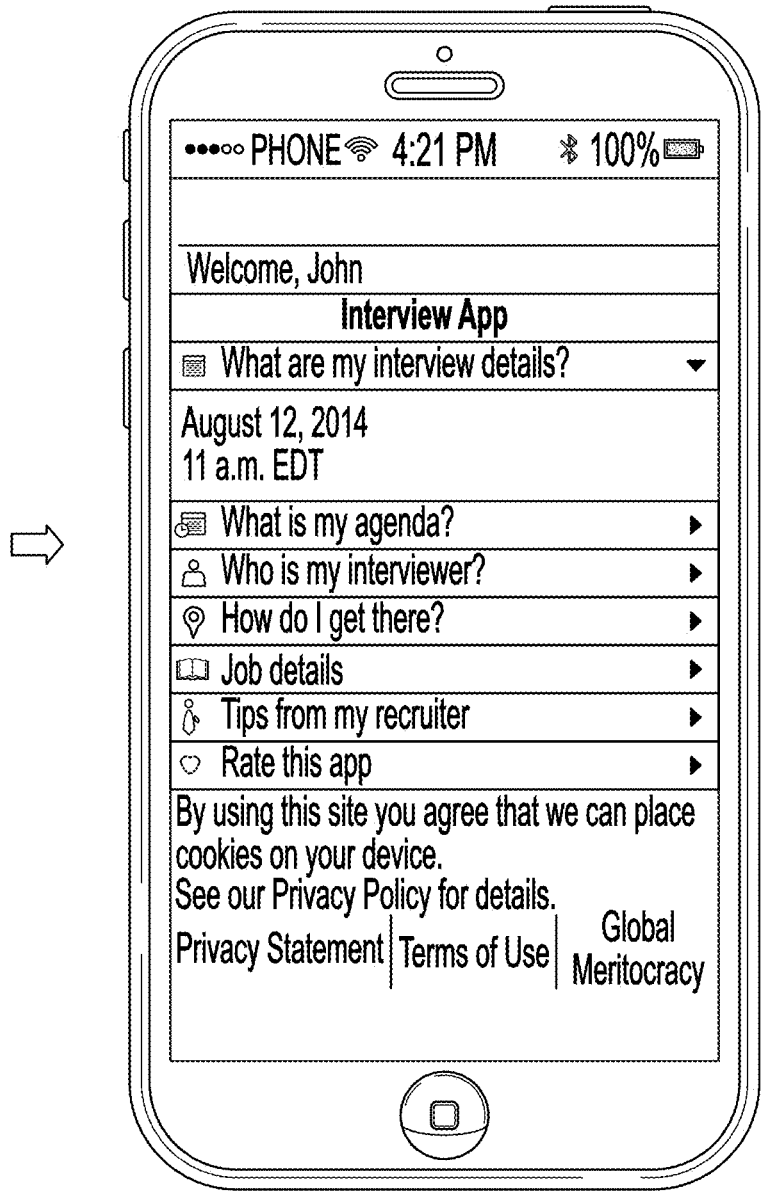

FIGS. 14A-C illustrate an example that a session creator, such as a recruiter, enters the information that is displayed in the user interface on the mobile device for the session (job interview). There are two user interfaces shown in FIGS. 14A, 14B and 14C. One is for the session creator (recruiter) to create the session (interview) 1400 and 1404 as shown in FIGS. 14A and 14B and another is for the Session App (Interview App) to display the interview information 1402 on the mobile device as shown in FIG. 14C.

The data management system may prompt session creators (recruiters) to enter all the necessary information for the interview in the first interface, and send a notification to the candidate and interviewers via SMS or email to be displayed in mobile device, with a link to the web page.

The underlying web application may be written in the Python programming language using the Django web framework (www.djangoproject.com). The Microsoft stack equivalent to this would be ASP.NET MVC (www.asp.net/mvc) running on IIS. The front-end of the web application may be rendered using a set of HTML templates, CSS markup, and JavaScript code files, similar to many modem web applications.

The server in the backend may be kept up-to-date with the latest security fixes and software releases using the standard 'apt-get' upgrade procedure. The access may be gained to the server via a 'root shell account' (using the SSH protocol). Developers currently may login using this method to perform each deployment of the web app. The system (Linode as an example in this case) may send automatic warning emails if the CPU usage, disk IO rate, incoming/outgoing traffic rates or transfer quota exceed sensible levels. Finally, uptime and performance monitoring of the web application may be managed with Pingdom (www.pingdom.com). Engineers may be notified by SMS and email when there is any downtime or problem with the response times.

FIGS. 15A-B illustrate an example to create data records in the user interface of the backend system for the session (job interview) 1500. The combination of FIG. 15A and FIG. 15B may be an example of a recruiter penal. The recruiter panel may be the main interface for recruiters and administrators to enter all the necessary information into the system to be sent to job candidates and/or interviewers.

Users that are able to access the recruiter panel on the backend data management system may have one of the following access levels:

Recruiter:
   Can add and edit own Interviews, Candidates, Jobs and Interviews
   Can see Candidates and Jobs within their Team
   Can see Offices and Countries (cannot add or modify)
Team Lead:
   Can add and edit Interviews, Candidates, Interviewers, Jobs and Feedback within their Team
   Can add and edit Offices and Countries, Foursquare categories, Special offers, Recruiter Tips and Recruiter Logins within their Team
Superuser:
   Can add and edit Offices and Countries, Recruiter Tips and Recruiter Logins globally
   Can add and edit Interviews, Candidates, Interviewers, Jobs and Feedback Any user may create an interview in the database by filling in all the required information and send links to both job candidate and interviewer(s) to access the related pages (candidate and interviewer interfaces).

Figure 16A:
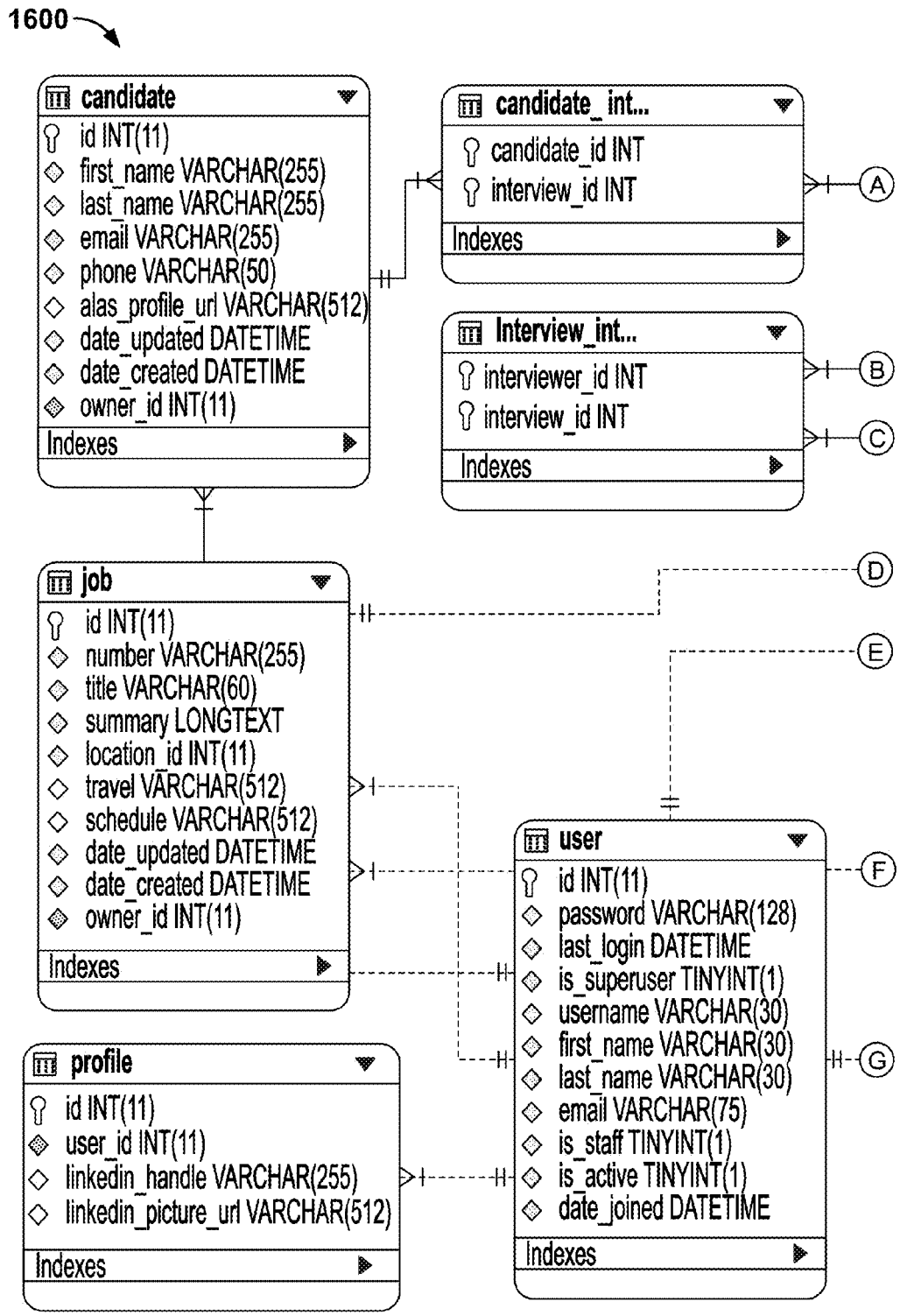
FIGS. 16-B illustrate an example of the data structure that supports the Session App.
Figure 16B:
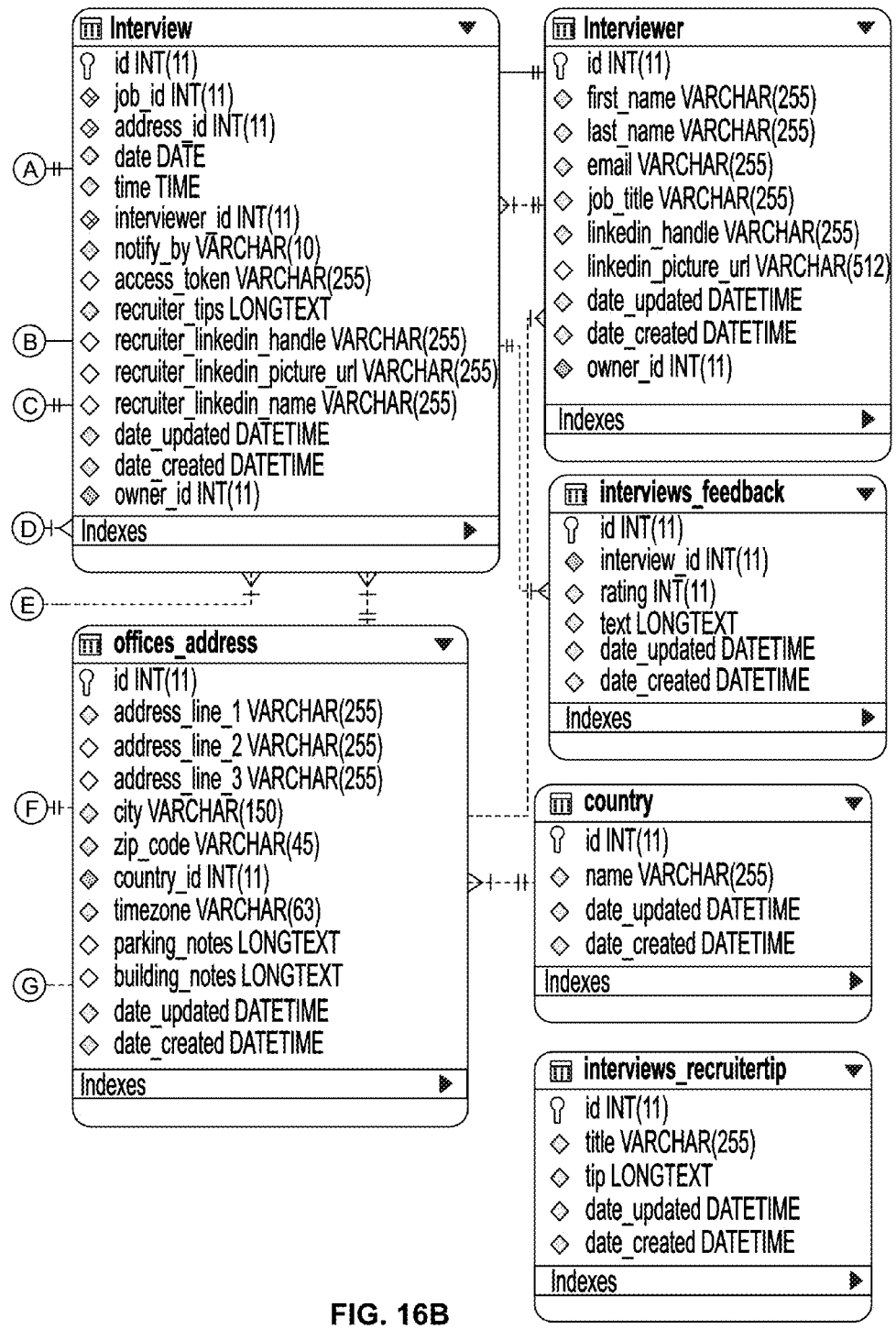

FIGS. 16A-B illustrate an example of the data structure that supports the Session App (Interview App) 1600. As an example of the solution, a SQL database may be used and a Python/Django executable may be to provide the required functionality. Each interview may exist as a separate entity, with a dedicated front-end page displayed to the candidate and interviewers. The database architecture may be designed with modular, low coupling and high cohesion approach. The combination of FIG. 16A and FIG. 16B show a relationship entity diagram of the data structure for one example of the database architecture.

This relationship entity diagram in FIG. 16 demonstrates how highly relational the database for the Session App (Interview App) may be. The "crow's feet" here denote the relationships between two tables; the three-pronged symbol meaning "many" one side of a connector, the single line meaning "one". For example, there may be a one-to-many relationship between Office Addresses and each Interview as illustrated in the diagram. The database may have separate tables for all key data entities: Interview, Candidate, Interviewer and Job. Vertical scaling of the database on those tables may be enabled by using MySQL replication and sharding. This approach may be recommended as the most common way of managing large-scale systems.

Figure 17:
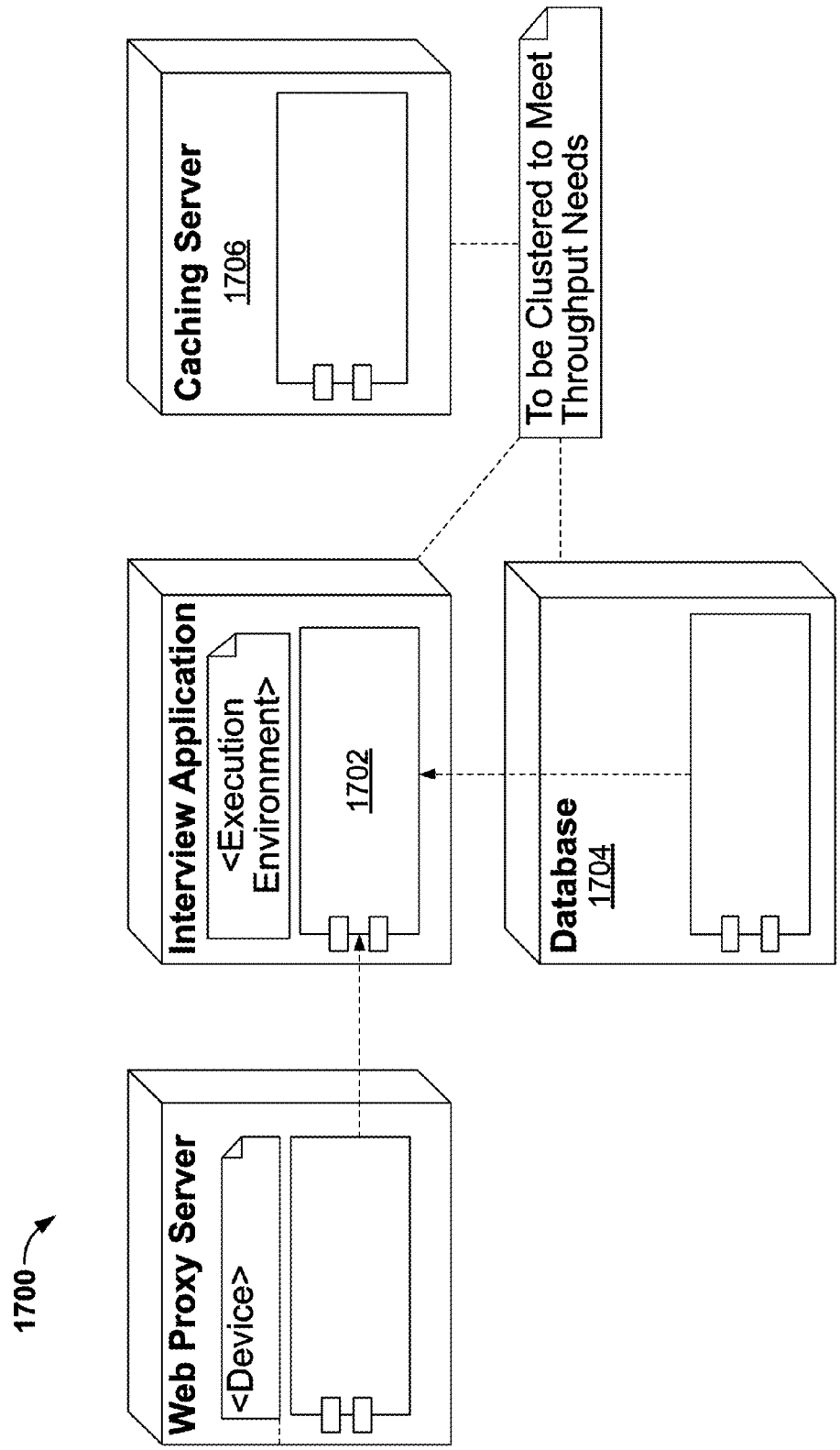
FIG. 17 illustrates an example for the backend architect that supports the Session App.

In order to process large amount of incoming requests, key system elements may be defined. The key system elements may be multiplied and scaled horizontally, with little to no downtime and maintenance required. Overall solution architecture may be illustrated by the deployment diagram shown in FIG. 17. FIG. 17 illustrates an example for the backend architect that supports the Session App (Interview App) 1700.

FIG. 17 shows scalability components. As shown in FIG. 17, the three key scalability components are the Django executable 1702, the Database server 1704, and the Caching server 1706. Depending on the load conditions, those components may be clustered to meet throughput needs. For example, given large amounts of data under management and moderate concurrent user activity, a new database server may be added to the existing cluster, without any downtime, to accommodate growing amounts of data. In case of high load of concurrent user activity, the execution and caching servers may be added to provide additional processing resources to meet the scalability needs.

Figure 18A:
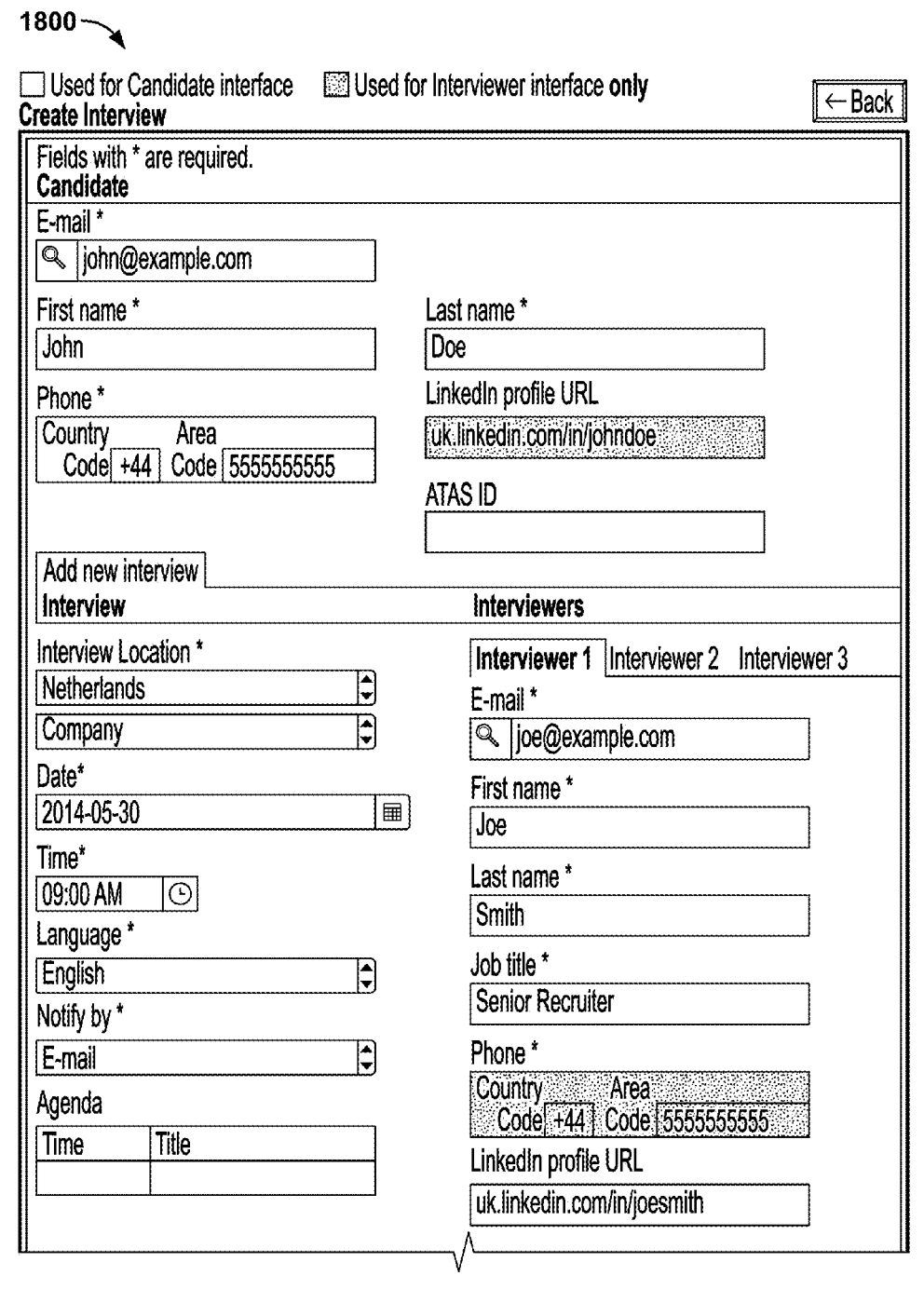

FIGS. 18A-B show an example for the backend user interface 1800 for creating data entries for the job candidate and the interviewer. The combination of FIG. 18A and FIG. 18B illustrate the relationship between the form fields for the two interfaces. Fields marked in darker color may be only used in the interviewer interface and may be disabled in the system unless manually enabled by the user of the system.

Figure 19:
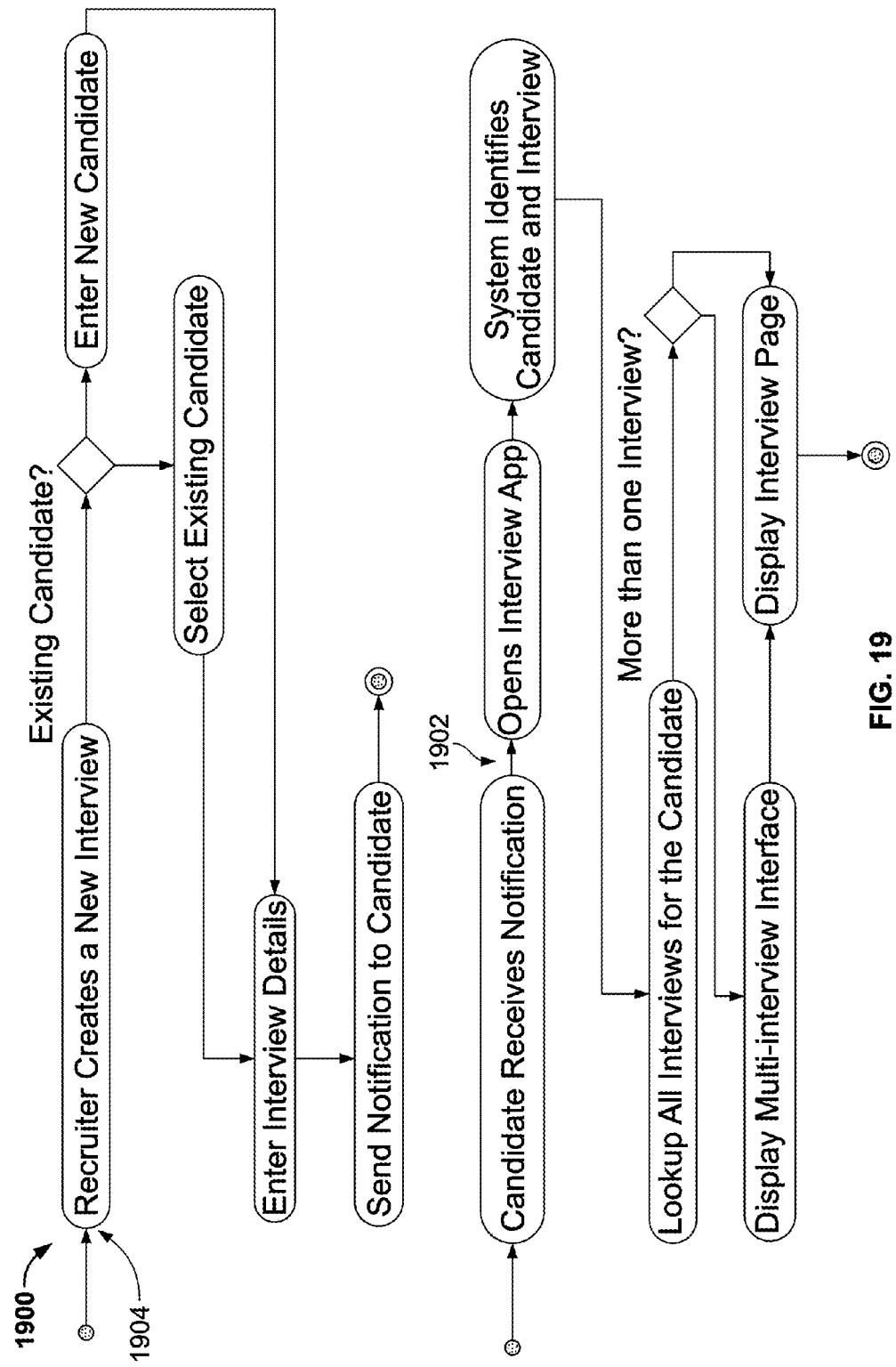
FIG. 19 shows an example of the backend data flow to support the Session App.

FIG. 19 shows an example of the backend data flow 1900 to support the Session App (Interview App). As illustrated in FIG. 19, the system may provide a link 1902 between a candidate and all their interviews, which may be easy to find and manage by recruiters. When creating a new interview 1904, a recruiter may start by selecting existing or entering a new candidate. The system may send a separate link for each interview to candidates and interviewers. When the page is opened, the system may detect all interviews that belong to the candidate which are less than 24 hours old. They may be displayed as additional tabs on the top of the page.

Figure 20:
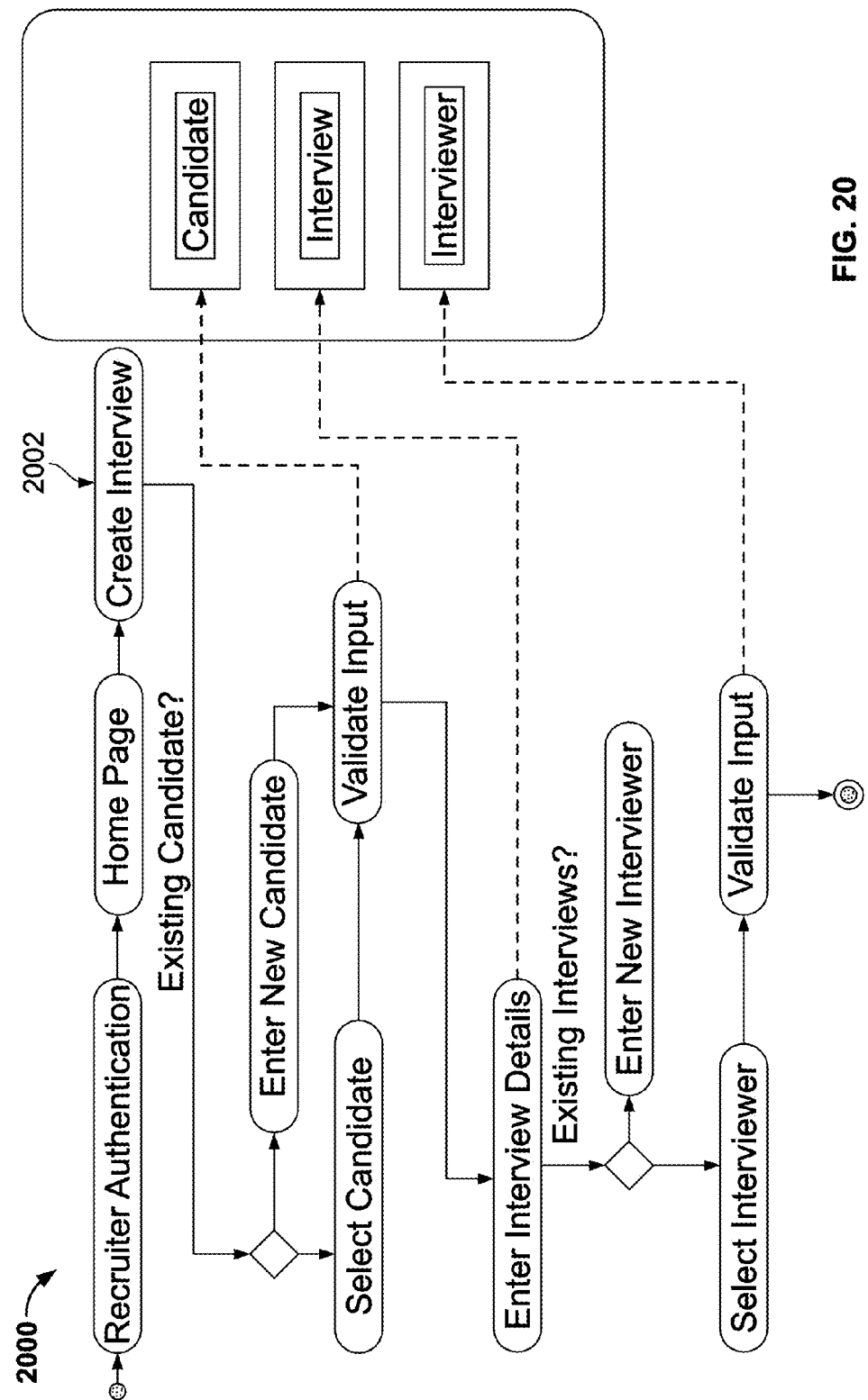
FIG. 20 shows an example of the backend data flow and the database integration to support the Session App.

FIG. 20 shows an example of the backend data flow and the database integration 2000 to support the Session App (Interview App). When creating a new interview 2002, a recruiter may select existing interviewers from the database or enter a new one. The input may be validated and stored as a separate entity in the database. The overall process is illustrated in the activity diagram shown in FIG. 20.

Figure 21:
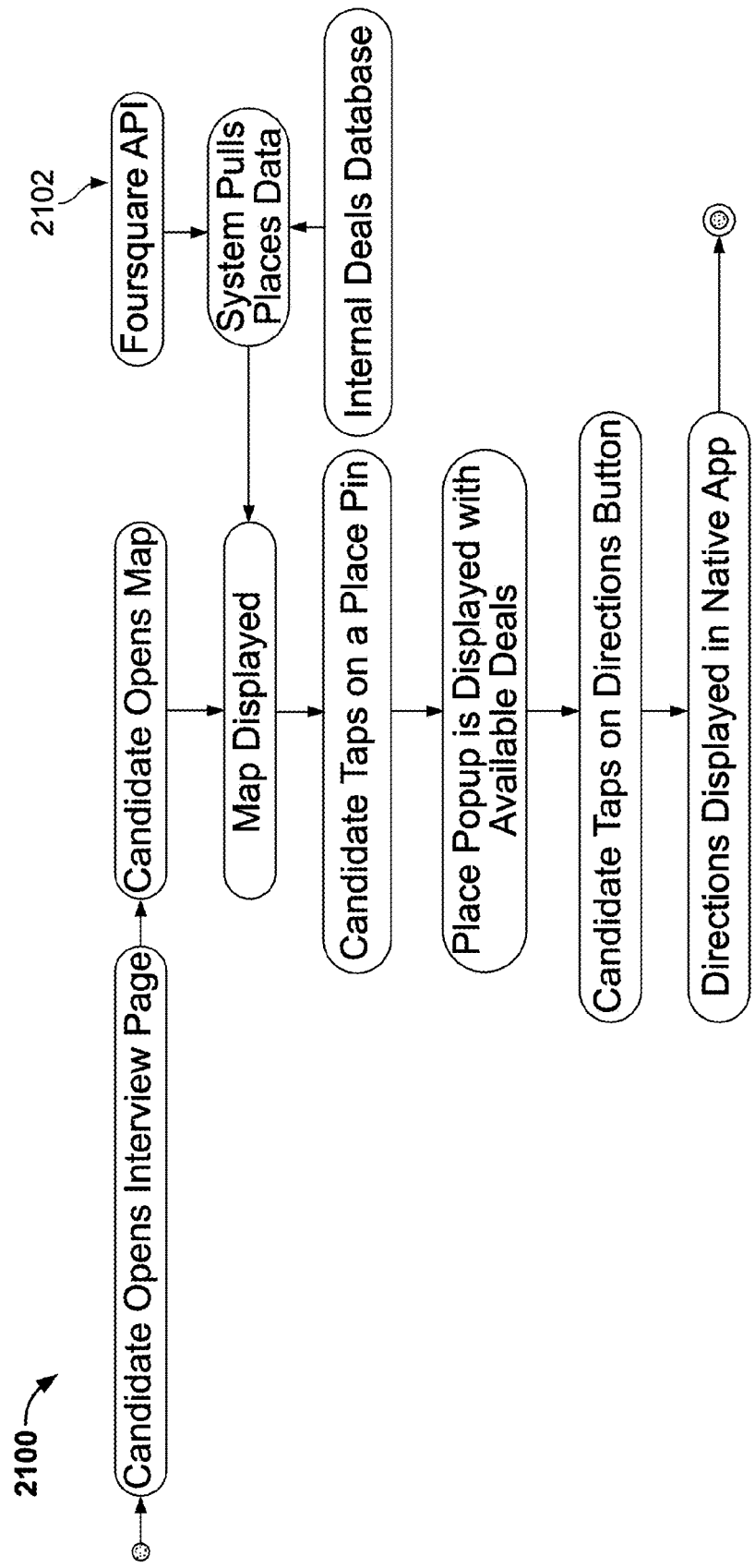
FIG. 21 shows an example of the backend data flow to integrate with the external system.

FIG. 21 shows an example of the backend data flow 2100 to integrate with the external system. In order to provide additional value and improve overall interview experience for candidates, the system may incorporate places data into the application, and the system may be possible to offer special deals around the interview location to the job candidate. Foursquare 2100 (http://www.foursquare.com) may be used as a source of places data. Also, special deals may be managed internally inside the system. A superuser or a team lead may enter special deals in the system, using a separate management area. The integration with the external system Foursquare 2100 is illustrated with the activity diagram shown in FIG. 21. When displaying an interview page, the system may pull places data from Foursquare API 2102. This is combined with internal deals database, to offer discounts and special offerings to the job candidate.

Figure 22:
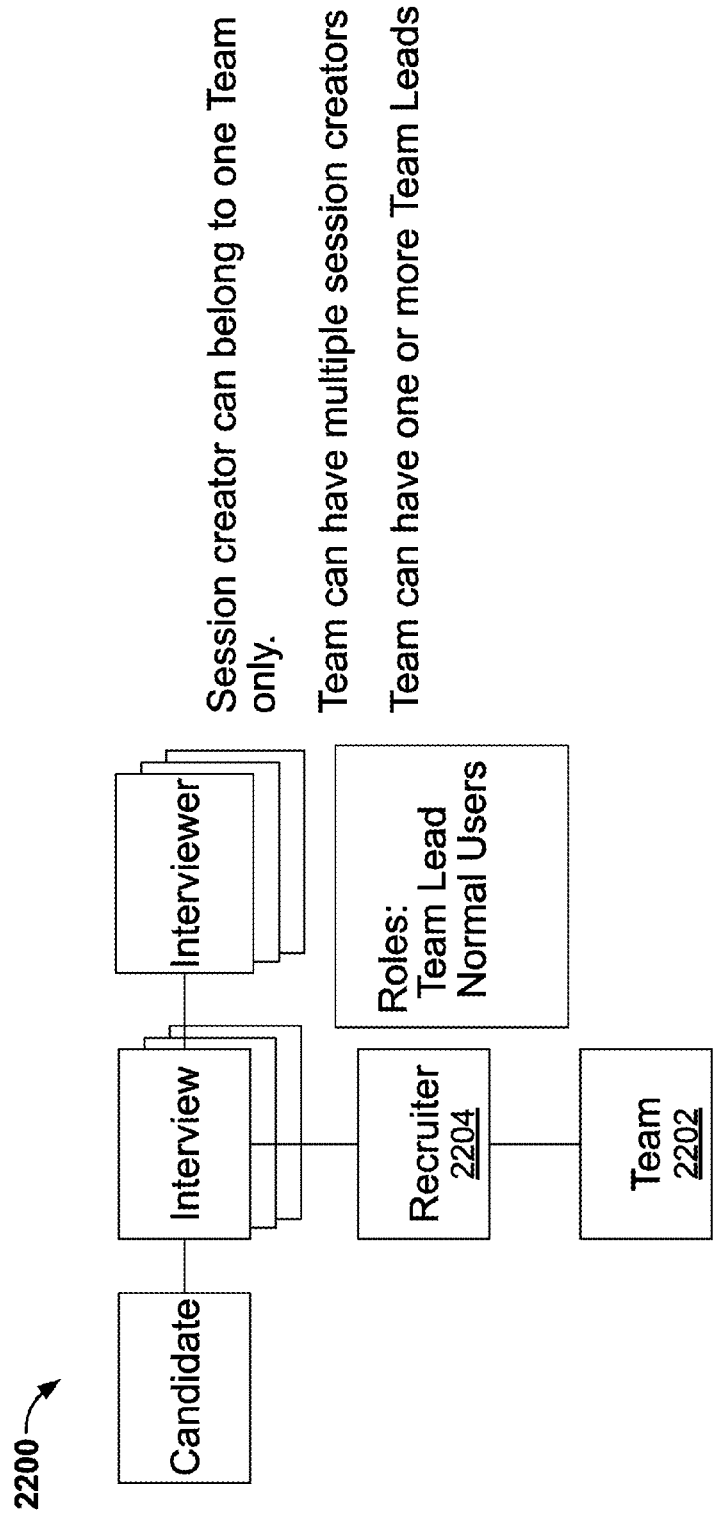
FIG. 22 shows an example of a database structure for different roles that are used in the backend system to support the Session App.

FIG. 22 shows an example of a database structure 2200 for different roles that may be used in the backend system to support the Session App (Interview App). The database structure shown in FIG. 22 provides a link between a User and a Team 2202. As shown in FIG. 22, Recruiter may belong to one Team only, Team may have multiple Recruiters 2204, and the Team may have one or more Team Leads.

Figure 23:
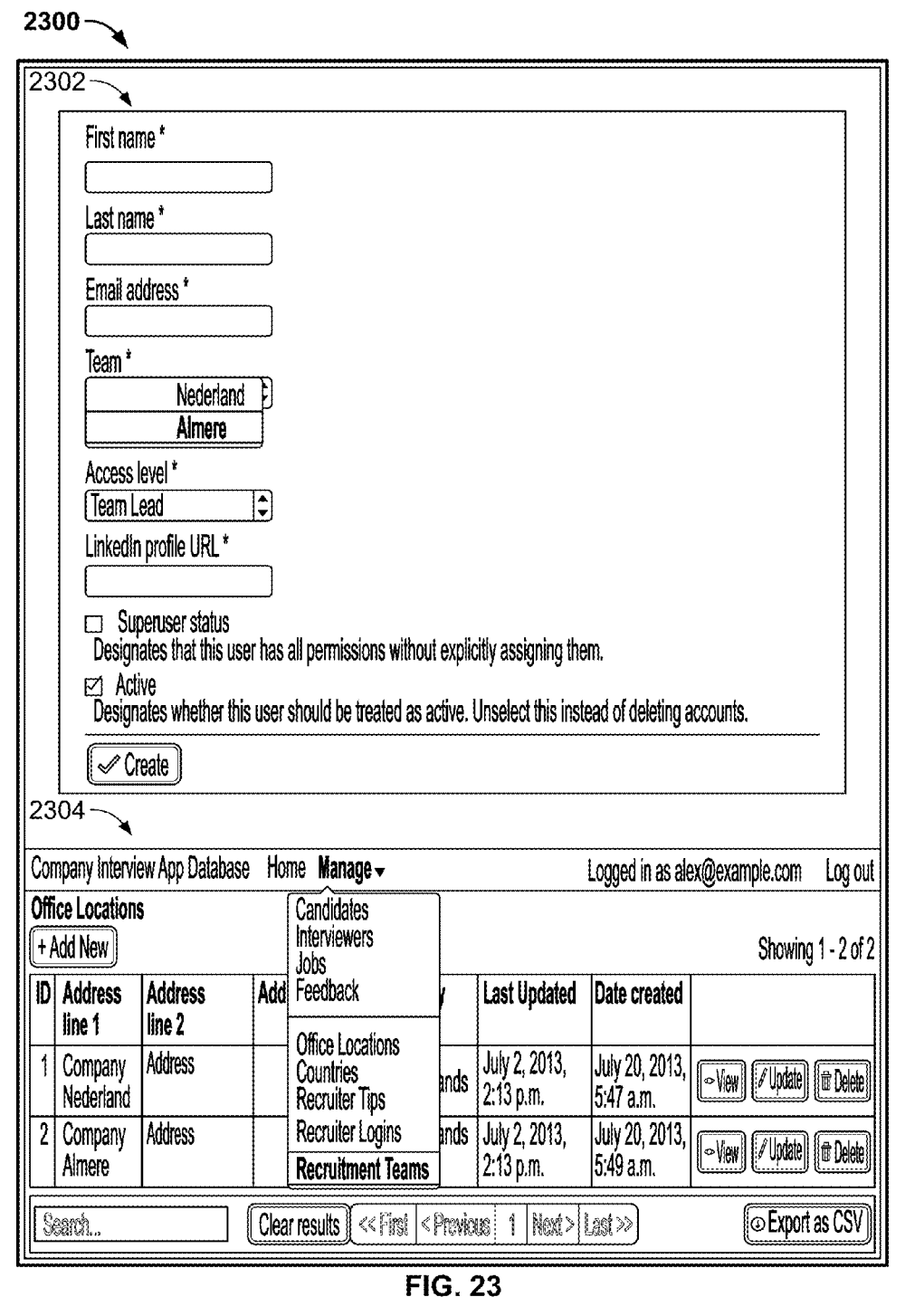

FIG. 23 shows an example of the user interface 2300 for creating roles 2303 and displaying office locations 2304 in the backend user interface. As illustrated in FIG. 23, when creating a Recruiter Login, Super Users or Team Leads may select the Team they belong to. Super Users may add and change Teams in the system.

FIG. 24 shows an example for selecting language in the backend 2400 user interface. For job candidates to use the Session App (Interview App) in their language, there may be a field on the Interview form in the user interface of the backend data management system, where the Recruiter may choose what language the app should use for the job candidate. An example is shown in FIG. 24.

Figure 25:
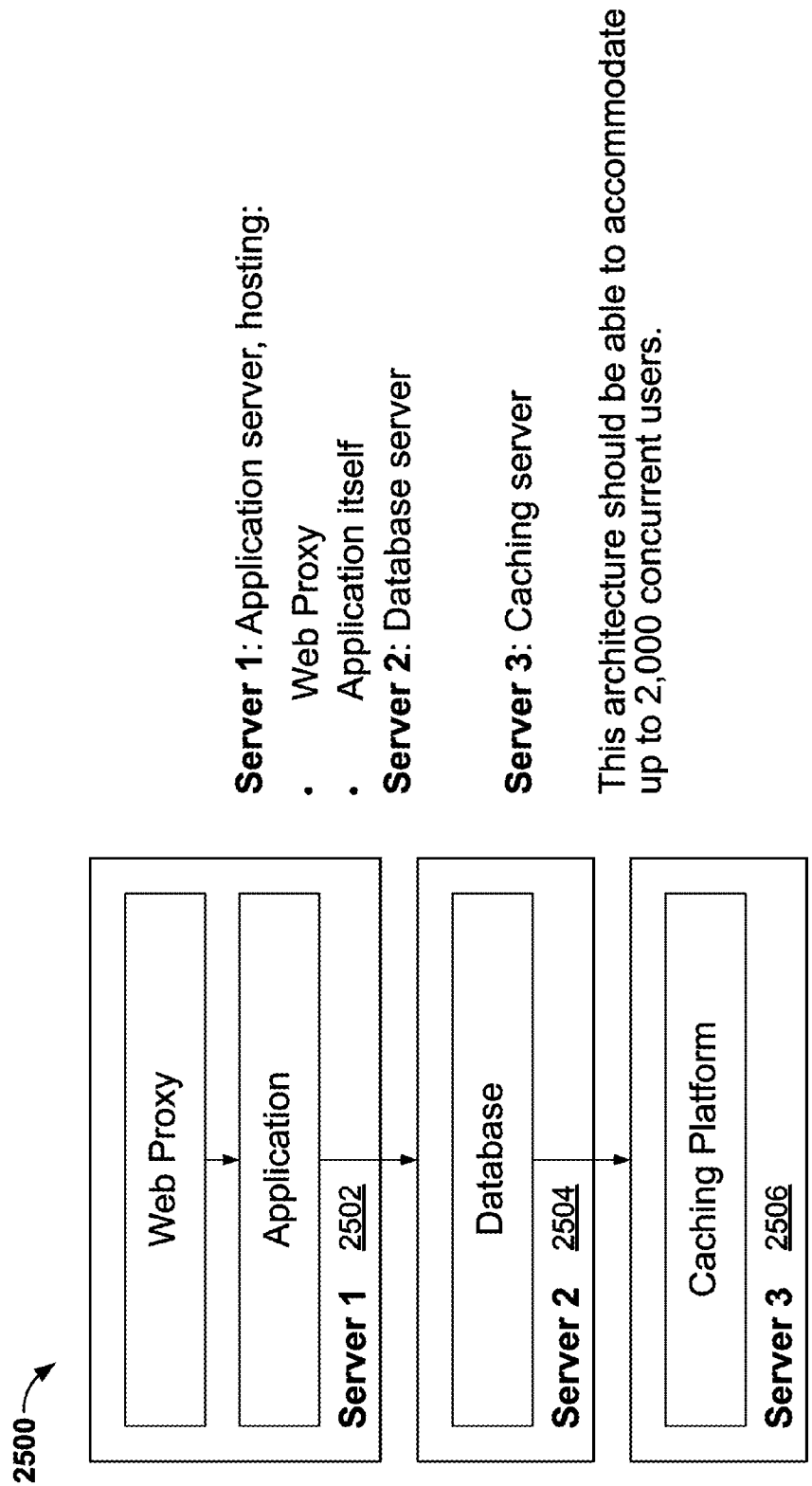
FIG. 25 shows an example of the backend architecture view to support the Session App.

FIG. 25 shows an example of the backend architecture view 2500 to support the Session App (Interview App). As shown in FIG. 25, Server 1 2502 may be the application server, which hosts: Web Proxy (nginx) and Application itself (Django). Server 2 2504 may be a database server that supports a relational database. Server 3 2506 may be a caching server. This architecture may accommodate up to 2,000 concurrent users. In addition, the server may be configured as: Server 1: RAM: 4 GB, CPU: 4 cores, Storage: 100 GB; Server 2: RAM: 16 GB, CPU: 4 cores, Storage: 500 GB; Server 3: RAM: 16 GB, CPU: 2 cores, Storage: 20 GB.

Figure 26:
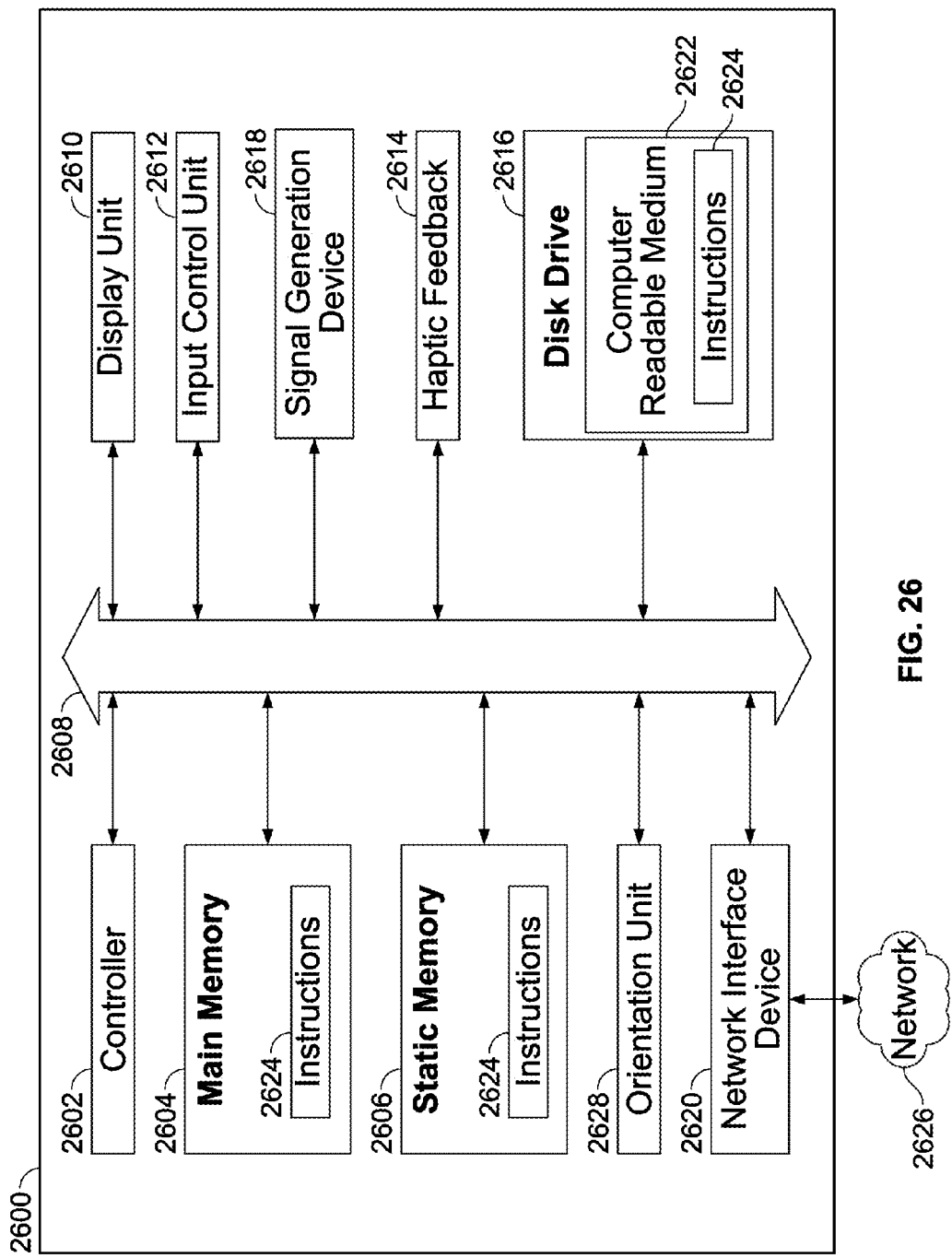
FIG. 26 illustrates an example of a computer system that may be used by the method.

Referring to FIG. 26, an illustrative embodiment of a computer system that may be used for one or more of the components illustrated by the method, system and device in FIGS. 1-3, or in any other system configured to carry out the methods discussed in this disclosure herein, is shown and is designated 2600. Although the computer system 2600 is illustrated in FIG. 26 as including all of the components as illustrated, it is within the scope of this innovation for the computing system to be comprised of fewer, or more, components than just illustrated in FIG. 26.

The computer system 2600 can include a set of instructions 2624 that can be executed to cause the computer system 2600 to perform any one or more of the methods, processes or computer-based functions disclosed herein. For example, an interview tool as described herein may be a program comprised of a set of instructions 2624 that are executed by the controller 2602 to perform any one or more of the methods, processes or computer-based functions described herein. Such a program may be stored in whole, or in any combination of parts, on one or more of the exemplary memory components illustrated in FIG. 26, such as the main memory 2604, static memory 2606, or disk drive 2616.

As described, the computer system 2600 may be mobile device. The computer system 2600 may also be connected using a network 2626, to other computer systems or peripheral devices. In a networked deployment, the computer system 2600 may operate in the capacity of a server or as a client user computer in a server-client user network environment, or as a peer computer system in a peer-to-peer (or distributed) network environment. In addition to embodiments in which the computer system 2600 is implemented, the computer system 2600 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 2600 can be implemented using electronic devices that provide voice, video or data communication. Further, while a single computer system 2600 is illustrated, the term "system" shall also be taken to include any collection of systems or sub-systems that individually or jointly execute a set, or multiple sets, of instructions to perform one or more computer functions.

As illustrated in FIG. 26, the computer system 2600 may include a controller 2602, such as a central processing unit ("CPU"), a graphics processing unit ("GPU"), or both. Moreover, the computer system 2600 can include a main memory 2604, and additionally may include a static memory 2606. In embodiments where more than one memory components are included in the computer system 2600, the memory components can communicate with each other via a bus 2608. As shown, the computer system 2600 may further include a display unit 2610, such as a liquid crystal display ("LCD"), an organic light emitting diode ("OLED"), a flat panel display, a solid state display, or a cathode ray tube ("CRT"). Additionally, the computer system 2600 may include one or more input devices 2612, such as a keyboard, push button(s), scroll wheel, digital camera for image capture and/or visual command recognition, touch screen, touchpad or audio input device (e.g., microphone). The computer system 2600 can also include signal outputting components such as a haptic feedback component 2614 and a signal generation device 2618 that may include a speaker or remote control.

Although not specifically illustrated, the computer system 2600 may additionally include a GPS (Global Positioning System) component for identifying a location of the computer system 2600.

Additionally, the computer system 2600 may include an orientation unit 2628 that includes any combination of one or more gyroscope(s) and accelerometer(s).

The computer system 2600 may also include a network interface device 2620 to allow the computer system 2600 to communicate via wireless, or wired, communication channels with other devices. The network interface device 2620 may be an interface for communicating with another computer system via a Wi-Fi connection, Bluetooth connection, Near Frequency Communication connection, telecommunications connection, internet connection, wired Ethernet connection, or the like. The computer system 2600 may also optionally include a disk drive unit 2616 for accepting a computer readable medium 2622. The computer readable medium 2622 may include a set of instructions that are executable by the controller 2602, and/or the computer readable medium 2622 may be utilized by the computer system 2600 as additional memory storage.

In a particular embodiment, as depicted in FIG. 26, the disk drive unit 2616 may include a computer-readable medium 2622 in which one or more sets of instructions 2624, such as software, can be embedded. Further, the instructions 2624 may embody one or more of the methods, processes, or logic as described herein. In a particular embodiment, the instructions 2624 may reside completely, or at least partially, within the main memory 2604, the static memory 2606, and/or within the controller 2602 during execution by the computer system 2600. The main memory 2604 and the controller 2602 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 2600 may encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 2622 that includes instructions 2624 or receives and executes instructions 2624 responsive to a propagated signal; so that a device connected to a network 2626 can communicate voice, video or data over the network 2626. Further, the instructions 2624 may be transmitted or received over the network 2626 via the network interface device 2620.

While the computer-readable medium 2624 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 2622 can include a solid-state memory such as a memory card or other package that houses one or more non-volatile read-only memories, such as flash memory. Further, the computer-readable medium 2622 can be a random access memory or other volatile re-writable memory. Additionally, the computer-readable medium 2622 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 2622 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A method for providing access on a mobile device for a session object to aggregated data associated with a session, the method comprising:

populating data records of a data repository of a data management system from an external data system, the external data system comprising locations and personnel identifications;

generating and storing first information in the data records stored in the data repository by associating a session identification with the session object, and selecting a session time, a session locality and candidate token information, wherein the first information comprises the session object, the session time, the session locality and the candidate token information;

caching the first information stored in the data repository on a caching server;

creating an application link and displaying the application link on mobile device, wherein the application link enables the access to the cached first information that is stored in the data repository;

providing an access authorization to the mobile device for accessing the first information by activating the application link displayed on the mobile device;

retrieving the cached first information from the caching server of the data repository of the data management system in response to activation of the application link by the mobile device after the access authorization for accessing the first information is provided;

displaying the cached first information in a user interface of the mobile device;

generating second information dynamically according to predetermined factors comprising: the session time and the session locality, and dynamic factors comprising a current time and a current location of the session object, wherein the second information comprises at least map information and a temporary venue;

displaying the second information in the user interface of the mobile device;

providing an evaluation, via the user interface, for the candidate token and storing the evaluation in the data repository; and deactivating the application link to revoke the access authorization to the first information and the second information in a pre-determined period after the session time;

wherein the candidate token is representative of a job applicant, and the session object is representative of an interviewer.

2. The method of claim 1, further comprising:

sending a system notification automatically to the mobile device when the first information is not available due to at least one of: a system use exceeds an overflow threshold and system maintenance.

3. The method of claim 1, wherein the generating first information further comprises:

selecting at least a subset of information of a second session associated with the session identification of the session object from the data repository of the data management system.

4. The method of claim 1, wherein the data management system comprises a language support application that provides a selectable non-English language to be displayed in the user interface of the mobile device.

5. The method of claim 1, further comprising:

providing an input field on the user interface of the mobile device to allow submission of feedback from the user interface of the mobile device.

6. The method of claim 1, wherein the application link is displayed in a second user interface on the mobile device wherein the second user interface is different from the user interface on the mobile device to display the first information and the second information.

7. The method of claim 1, further comprising:

providing a video connection between the user interface on the mobile device and an external user interface of an external user terminal that allows the video connection to be used to conduct the session remotely.

8. The method of claim 1, wherein the generating the first information comprises:

selecting the data records in the data repository for a plurality of sessions.

9. The method of claim 1, wherein the user interface of the mobile device displays an expandable list of categories comprising an agenda, session details, a candidate token category, a video session, job details and elevator moments.

10. The method of claim 9, wherein the agenda comprises a session time schedule, the candidate token category comprises a candidate token profile; and the elevator moments comprise questions and answers for the session object in the session.

11. The method of claim 9, wherein the expandable list of categories further comprises session locality details comprising a direction to the session locality and a map showing the session locality.

12. The method of claim 1, wherein the data management system comprises a backend user interface that allows data records associated with the session to be entered into the data management system.

13. The method of claim 12, wherein the data management system further comprises a data validation that validates the data records entered from the backend user interface.

14. The method of claim 1, wherein
the data management system at least comprises: a web application server, a database server and a caching server wherein the web application server is used as both a web proxy server and an application server.

15. A system for providing access on a mobile device for a session object to aggregated data associated with a session, the system comprising:
a processor and a non-transitory computer readable medium storing computer instructions configured to cause the processor to:
populate data records of a data repository of a data management system from an external data system, the external data system comprising locations and personnel identifications;
generate and store first information in the data records stored in the data repository by associating a session identification with the session object, and selecting a session time, a session locality and candidate token information, wherein the first information comprises the session object, the session time, the session locality and the candidate token information;
cache the first information stored in the data repository on a caching server;
create an application link and displaying the application link on a mobile device, wherein the application link enables the access to the cached first information that is stored in the data repository;
provide an access authorization to the mobile device for accessing the first information by activating the application link displayed on the mobile device;
retrieve the cached first information from the caching server of the data repository of the data management system in response to activation of the application link by the mobile device after the access authorization for accessing the first information is provided;
display the cached first information in a user interface of the mobile device;
generate second information dynamically according to predetermined factors comprising: the session time and the session locality, and dynamic factors comprising a current time and a current location of the session object, wherein the second information comprises at least map information and a temporary venue;
display the second information in the user interface of the mobile device;
provide an evaluation, via the user interface, for the candidate token and store the evaluation in the data repository; and
deactivate the application link to revoke the access authorization to the first information and the second information in a pre-determined period after the session time;
wherein the candidate token is representative of a job applicant, and the session object is representative of an interviewer.

16. The system of claim 15, further comprising the instructions to:
send a system notification automatically to the mobile device when the first information is not available due to at least one of: a system use exceeds an overflow threshold and system maintenance.

17. The system of claim 15, wherein
the application link is displayed in a second user interface on the mobile device wherein the second user interface is different from the user interface on the mobile device to display the first information and the second information.

18. A mobile device for providing access on the mobile device for an session object to aggregated data associated with a session, comprising a user interface that is configured to:
display an application link in the mobile device, wherein the application link enables the access to first information that is stored in a data repository of a data management system, wherein the data management system populates data records stored in the data repository from an external data system, the external data system comprising locations and personnel identifications;
activate the application link displayed on the mobile device to gain an access authorization for accessing the first information stored in the data repository, the first information being generated and stored in the data records stored in the data repository by associating a session identification with the session object, and selecting a session time, a session locality and candidate token information, wherein the first information comprises the session object, the session time, the session locality and the candidate token information, and wherein the first information is cached in a caching server;
retrieve the cached first information from the caching server of the data repository of the data management system in response to activation of the application link by the mobile device after the access authorization for accessing the first information is provided;
display the cached first information in a user interface of the mobile device;
receive second information that is dynamically generated according to predetermined factors and dynamic factors wherein the predetermined factors comprise: the session time and the session locality, and the dynamic factors comprise: a current time and a current location of the session object, and wherein the second information comprises at least map information and a temporary venue;
display the second information in the user interface of the mobile device;
receive an evaluation, via the user interface, for the candidate token and store the evaluation in the data repository; and
indicate that the application link is deactivated to revoke the access authorization to the first information and the second information in a pre-determined period after the session time;
wherein the candidate token is representative of a job applicant, and the session object is representative of an interviewer.

19. The mobile device of claim 18, wherein the user interface is further configured to:
display a system notification automatically on the mobile device when the first information is not available due to at least one of: a system use exceeds an overflow threshold and system maintenance.

20. The mobile device of claim 18, wherein the user interface is further configured to:
provide a video connection between the user interface on the mobile device and an external user interface of an external user terminal that allows the video connection to be used to conduct the session remotely.

\* \* \* \* \*